United States Patent [19]
Mackinlay et al.

[11] Patent Number: 5,276,785
[45] Date of Patent: Jan. 4, 1994

[54] MOVING VIEWPOINT WITH RESPECT TO A TARGET IN A THREE-DIMENSIONAL WORKSPACE

[75] Inventors: Jock Mackinlay; George G. Robertson, both of Palo Alto; Stuart K. Card, Los Altos Hills, all of Calif.

[73] Assignee: Xerox Corporation, Stamford, Conn.

[21] Appl. No.: 561,627

[22] Filed: Aug. 2, 1990

[51] Int. Cl.⁵ .............................................. G06F 15/62
[52] U.S. Cl. .................................................... 395/127
[58] Field of Search ..................... 395/127, 129, 121; 340/723, 724, 725

[56] References Cited

U.S. PATENT DOCUMENTS

| | | | |
|---|---|---|---|
| 4,734,690 | 3/1988 | Waller | 340/729 |
| 4,991,022 | 2/1991 | Canfield et al. | 358/180 |
| 5,019,809 | 5/1991 | Chen | 340/815.31 |
| 5,021,976 | 6/1991 | Wexelblat et al. | 364/521 |
| 5,072,412 | 12/1991 | Henderson, Jr. et al. | 395/159 |
| 5,095,302 | 3/1992 | McLean et al. | 340/710 |
| 5,103,217 | 4/1992 | Cawley | 395/129 |
| 5,107,443 | 4/1992 | Smith et al. | 395/158 |
| 5,124,693 | 6/1992 | Himelstein et al. | 340/729 |
| 5,129,054 | 7/1992 | Alstad et al. | 395/155 |

FOREIGN PATENT DOCUMENTS 0353952  2/1990  European Pat. Off. .

OTHER PUBLICATIONS

Fairchild, K. M., Poltrock, S. E., and Furnas, G. W., "Semi Net: Three-Dimensional Graphic Representations of Large Knowledge Bases," in Guindon, R., ed., *Cognitive Science and its Applications for Human-Computer Interaction*, Lawrence Erlbaum, Hillsdale, N.J., 1988, pp. 201-233.

Burton, R. R., Sketch: A Drawing Program for Interlisp-D, Xerox Corporation, Palo Alto Research Center, ISL-14, Aug. 1985, pp. 44-49.

Robertson, G. G., Card, S. K., and Mackinlay, J. D., "The Cognitive Coprocessor Architecture for Interactive User Interfaces," *Proceedings of the ACM SIGGRAPH Symposium on User Interface Software and Technology*, Williamsburg, Va., Nov. 13-15, 1989, pp. 10-18.

Herot, C. F., Carling, R., Friedell, M., and Kramlich, D., "A Prototype Spatial Data Management System," ACM, 1980; pp. 63-70.

Badler, N. I., Manochehri, K. H. Baraff, D., "Multi-Dimensional Input Techniques and Articulated Figure Positioning by Multiple Constraints," *Proceedings*, 1986 Workshop on Interactive 3D Graphics, ACM, Oct. 23-24, 1986, pp. 151-169.

Brooks, Jr., F. P., "Walkthrough-A Dynamic Graphics System for Simulating Virtual Buildings," *Proceedings, 1986 Workshop on Interactive 3D Graphics*, ACM, Oct. 23-24, 1986, pp. 9-21.

(List continue on next page.)

*Primary Examiner*—Gary V. Harkcom
*Assistant Examiner*—Mike Smith

[57] ABSTRACT

Images are presented on a display to produce the perception of viewpoint motion in a three-dimensional workspace. The user can indicate a point of interest (POI) or other region on a surface in an image and request viewpoint motion. In response, another image is presented from a viewpoint that is displaced as requested. The user can request viewpoint motion radially toward or away from the POI, and can also request viewpoint motion laterally toward a normal of the surface at the POI. Radial and lateral viewpoint motion can be combined. The orientation of the viewpoint can be shifted during lateral motion to keep the POI in the field of view, and can also be shifted to bring the POI toward the center of the field of view. In a sequence of steps of viewpoint motion, the radial viewpoint displacement in each step can be a proportion of the distance to the POI so that the radial displacements follow a logarithmic function and define an asymptotic path that approaches but does not reach the POI. While requesting viewpoint motion with a keyboard, the user can independently request POI motion with the mouse. In response, the POI moves within the bounds of the surface that includes the POI, and a shape within the image indicates the POI position.

64 Claims, 12 Drawing Sheets

OTHER PUBLICATIONS

Ware, C., Osborne, S., "Exploration and Virtual Camera Control in Virtual Three Dimensional Environments," *Proceedings, 1990 Symposium on Interactive 3D Graphics Computer Graphics* 24, #4, Mar. 1970, pp. 175–183.

Bier, E. A., *Snap-Dragging: Interactive Geometric Design in Two and Three Dimensions*, Xerox Corporation, EDL-89-2, Sep. 1989, p. 117.

Haeberli, P. E., "ConMan: A Visual Programming Language for Interactive Graphics," *Computer Graphics*, vol. 22, No. 4, Aug. 1988, pp. 103–111.

Dalton, R., "Beyond Bifocals: Help for Tired Eyes," *Loftus*, vol. 4, No. 10, Oct. 1988, pp. 17–18.

InLarge brochure, Berkeley Systems, Inc., Berkeley, California, 1989.

"MAG (6D)," IRIS-4D Series Man Pages, *IRIX User's Reference Manual*, Section 6, Release 3.3, Silicon Graphics, Inc., Mountain View, California, Apr. 1990 p. 1.

"Window," *Graphics Library Programming Guide*, IRIS-4D Series, Document Version 2.0, Coordinate Transformations, Document No. 007-1210-020, Silicon Graphics, Inc., Mountain View, California, May 1990, pp. 7–8 and 7–9.

Woods, D. D., "Visual Momentum: A Concept to Improve the Cognitive Coupling of Person and Computer," *Int. J. Man-Machine Studies* 21, 1984, pp. 229–244.

Hochberg, J., Brooks, V., "Film Cutting and Visual Momentum," in Senders, J. W., Fisher, D. F., and Monty, R. A., Eds. *Eye Movements and the Higher Psychological Functions*, Hillsdale, N.J.: Lawrence Erlbaum Associates; 1978; pp. 293–313.

Glassner, A. S., *3D Computer Graphics*, Second Edition, 1989, New York: Design Press, Chapter 14, pp. 177–194.

Foley, J. D., van Dam, A., Feiner, S. K., Hughes, J. F., *Computer Graphics*, Second Edition, 1990, Reading, Mass.: Addison-Wesley, Chapter 21, pp. 1057–1081.

MOVING VIEWPOINT WITH RESPECT TO A TARGET IN A THREE-DIMENSIONAL WORKSPACE

BACKGROUND OF THE INVENTION

The present invention relates to techniques for producing the perception of a moving viewpoint within a three-dimensional space presented on a display.

Fairchild, K. M., Poltrock, S. E., and Furnas, G. W., "SemNet: Three-Dimensional Graphic Representations of Large Knowledge Bases," in Guindon, R., ed., *Cognitive Science and its Applications for Human-Computer Interaction*, Lawrence Erlbaum, Hillsdale, N.J., 1988, pp. 201-233, describe SemNet, a three-dimensional graphical interface. SemNet provides semantic navigation techniques such as relative movement, absolute movement, and teleportation. Section 5 discusses navigation and browsing, including viewpoint movement techniques such as moving the viewpoint close to an element that the user needs to inspect. Section 5.2 describes methods for moving the viewpoint to determine the portion of a knowledge base that is displayed. Section 5.2.1 describes relative movement, with independent controls for three orthogonal rotations of the viewpoint and movement forward and backward along the line of sight. Tools for adjusting the velocity of movement and rotation are provided, but relative movement is slow and awkward to use. Section 5.2.2 describes absolute movement in which the user can point to a desired viewpoint location on a map of the three-dimensional knowledge space. The map can have two or three two-dimensional parts, with each part representing a coordinate plane in the space, and the user can manipulate the position of the viewpoint by moving an asterisk in one plane at a time using the mouse. A filter ensures that the viewpoint moves smoothly, retaining the experience of travel through a three-dimensional space. Although absolute movement is quicker and easier to use than relative movement, it is not very accurate and moving the viewpoint in more than one map is confusing. Section 5.2.3 describes teleportation, in which a user can pick a recently visited knowledge element from a menu and instantly move to the location of the knowledge element. Section 5.2.4 describes hyperspace movement, in which the nodes connected to a selected knowledge element are temporarily moved to positions around it, and then snap back to their original positions after a new node is selected.

Burton, R. R., *Sketch: A Drawing Program for Interlisp-D*, Xerox Corporation, Palo Alto Research Center. ISL-14, August 1985, pp. 44-49, describes techniques for changing the part of a sketch seen in a window. A sketch is a collection of elements such as lines and text. The sketch has a world coordinate space and the position of each element is given by values in this space. A sketch is viewed and edited inside a window, which shows a region of the coordinate space of a sketch and displays any of the elements that are in the region. The region is determined by the window's scale, its size, and the values of its left and bottom coordinate. As illustrated in FIGS. 59-62, a window's scale can be changed by the Move view command or the Autozoom command. The user can select the Move view command from the command menu and then use the cursor to specify a new portion of the sketch that is to appear in the window by depressing a mouse button at one corner and sweeping the cursor to the other corner; the specified region is scaled to fill the sketch window. The user can select the Autozoom command from the command menu, then move the cursor to the point in the sketch around which zooming will occur, then press one of two buttons to indicate whether to zoom in or zoom out; zooming in makes the image larger but with the point under the cursor in the same location, while zooming out makes the image smaller with the point under the cursor in the same location. The image continues to grow or shrink around the position of the cursor as long as either button is down.

SUMMARY OF THE INVENTION

The present invention provides techniques for operating a system to produce the perception of a moving viewpoint within a three-dimensional workspace. When the user indicates a point of interest on an object, the viewpoint can approach the point of interest asymptotically, with both radial and lateral motion. The orientation of the viewpoint can rotate to keep the point of interest in the field of view. The field of view can also be centered about the point of interest by rotating the viewpoint.

One aspect of the invention is based on the recognition of a basic problem in moving viewpoint in a three-dimensional workspace. It is frequently desirable to move the viewpoint closer to a specific target. For example, a user may wish to examine a detail of an object at close range. Conventional techniques do not provide an easy way for the user to obtain such viewpoint motion.

This aspect is further based on the discovery of a user interface technique that solves this problem. The user can indicate a target region and, in response, the viewpoint moves to an appropriate viewing position.

This technique can be implemented with a pointing device such as a mouse. The user can click a mouse button to indicate a region on the surface of the object to which the pointer is currently pointing. The user can also provide a signal requesting viewpoint motion toward an indicated point in the region, referred to as the "point of interest" or "POI". When the user requests viewpoint motion toward the POI, referred to as a "POI approach", the system can provide animated motion so that object constancy is preserved.

A related aspect of the invention is based on the recognition of a problem in performing POI approach. If viewpoint motion is rapid, the user has difficulty controlling the motion so that it stops at an appropriate position. But if viewpoint motion is slow, it requires too much time. Conventional viewpoint motion techniques do not handle this conflict satisfactorily.

This aspect is further based on the discovery that this problem can be solved by performing POI approach asymptotically based on coordinate data indicating the positions of the viewpoint and the POI in the three-dimensional workspace. For example, the viewpoint can move toward the POI along a ray in successively smaller increments that approach a final viewing position asymptotically.

This solution can be implemented with a logarithmic motion function. During each cycle of animation, the x-, y-, and z- displacements between the current viewpoint position and the POI can be reduced by the same proportional amount, referred to as an approach proportionality constant. As a result, a target object appears to grow at a constant rate of proportionality, making it easy to predict when the viewpoint will reach a desired position. This provides rapid motion initially, then progressively slower motion, allowing the user to control the motion more efficiently by repositioning the POI as the viewpoint nears the target. Also, this implementation provides the perception of natural movement in the three-dimensional workspace. POI approach can be constrained so that the viewpoint does not come too close to the POI.

Several closely related aspects of the invention are based on the recognition that POI approach does not meet all the viewpoint movement needs of a typical user.

One problem with simple POI approach is that it does not orient the viewpoint appropriately. This problem can be solved by adjusting the viewpoint, either during POI approach or independent of approach. One way to adjust the viewpoint is to move the viewpoint laterally toward the surface normal at the POI. Another is to rotate the viewpoint to keep the POI at the same position in the field of view or to move it toward the center of the field of view.

Lateral viewpoint motion has the incidental effect in many cases of moving the POI away from the center of the field of view. This problem can be solved with compensating viewpoint rotation. If the viewpoint is rotated through an angle equal to the angle subtended by lateral viewpoint motion, the POI will stay at the same position in the field of view.

In many cases, viewpoint motion as described above will nonetheless leave the POI at a substantial distance from the center of the field of view. This problem can be solved with centering viewpoint rotation. At each step, the viewpoint can be rotated up to a maximum viewpoint rotation in order to center the POI. This centering can be performed in addition to viewpoint rotation to compensate for lateral viewpoint motion.

If these and other types of viewpoint motion are provided in an inappropriate manner, the resulting motion may be awkward and confusing. Specifically, if the user must control too many degrees of freedom, the user may have difficulty obtaining a desired viewpoint motion.

Another technique is based on the discovery that different types of viewpoint motion can be integrated if the displacement between two steps is a function of distance between the viewpoint and the POI. With this approach, the displacement for each type of viewpoint motion from a given point can be independent of previous viewpoint motion and can be determined with a function that is compatible with other types of viewpoint motion from the same point.

One example of this approach is the integration of POI approach with viewpoint motion away from the POI, referred to herein as "POI retreat." As described above, POI approach can follow a logarithmic function with an approach proportionality constant. For symmetry between POI approach and retreat, the POI retreat function can be a logarithmic function with a retreat proportionality constant such that each retreating step between two points is equal in length to an approaching step in the opposite direction between the same two points.

Lateral viewpoint motion can also be integrated with POI approach and retreat to provide motion toward the surface normal at the POI. During each animation cycle, the displacement from POI approach or retreat is used to obtain an intermediate viewpoint; a vector normal to the POI is obtained and a lateral position point on the vector normal is found at a distance equal to the distance from the POI to the intermediate viewpoint; and the ending viewpoint is then found along a line from the intermediate viewpoint to the lateral position point. The line can be an arc or a chord. The displacement from the intermediate viewpoint to the ending viewpoint can be a proportion of the line, found using a lateral proportionality constant. To integrate this lateral motion with POI approach, the lateral proportionality constant should be sufficiently larger than the approach proportionality constant that the viewpoint comes close to the normal before reaching an appropriate distance for viewing the POI.

Another aspect of the invention is based on the recognition of an underlying problem in viewpoint motion relative to a POI. As viewpoint motion progresses, the user may wish to adjust the POI position, especially during POI approach in which the POI and the surrounding area become progressively larger on the display. The user could adjust POI position by ending viewpoint motion relative to the current POI and by then indicating a new POI and requesting viewpoint motion relative to the new POI. But this would produce an awkward sequence of viewpoint movements.

This aspect is further based on the discovery of a technique that adjusts POI position without interrupting viewpoint motion. With this technique, the user can produce a desired viewpoint motion while independently adjusting POI position. The user can control viewpoint motion by using keys to select from a few simple choices, such as moving the viewpoint toward the POI, moving the viewpoint away from the POI, or keeping the viewpoint at the previous position; in a lateral mode, each type of radial viewpoint motion can be combined with lateral viewpoint motion, with an additional choice for moving the viewpoint laterally without moving it toward or away from the POI. The user can control POI position using a user input device such as a mouse to indicate changes in position. Independently requesting viewpoint motion and POI position adjustment is especially effective because a typical user can readily make both types of requests at the same time without confusion. For example, the user can use one hand to request viewpoint motion and the other hand to control POI position.

A closely related aspect of the invention is based on the recognition that POI position adjustment can inadvertently lead to a jump of the POI from one object to another. This problem can be solved by constraining the POI to stay on the same object's surface during a viewpoint movement. This solution can be implemented by presenting a circle or other shape on the object's surface, centered on the POI, to assist the user in positioning the POI. When the user adjusts the POI's position, such as by operating a mouse, another circle is presented at the adjusted position, perceptible as a moved continuation of the previous circle.

The following description, the drawings and the claims further set forth these and other objects, features and advantages of the invention.

DETAILED DESCRIPTION

A. Conceptual Framework

Figure 1:
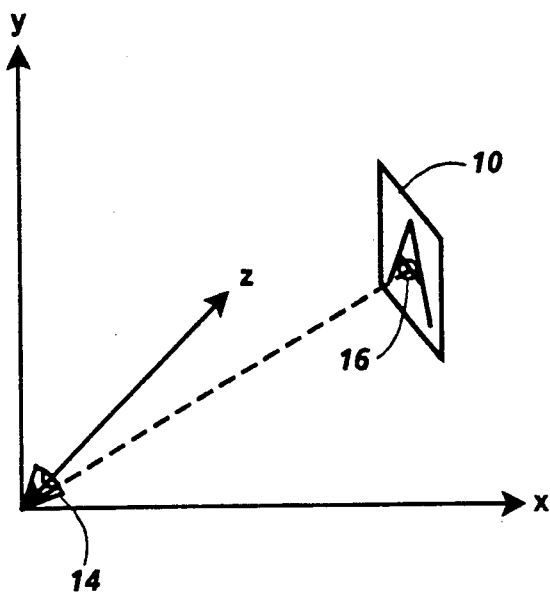
FIG. 1 is a schematic view of a surface perceptible from a viewpoint in a three-dimensional workspace.

The following conceptual framework is helpful in understanding the broad scope of the invention, and the terms defined below have the meanings indicated throughout this application, including the claims. This conceptual framework is a modification and extension of that set forth in copending, coassigned U.S. patent application Ser. No. 07/488,587, entitled "Display of a Workspace with Stretching," incorporated herein by reference.

A "data processing system" is a system that processes data. A "data processor" or "processor" is any component or system that can process data, and may include one or more central processing units or other processing components.

"User input means" is means for providing signals based on actions of a user. User input means can include one or more "user input devices" that provide signals based on actions of a user, such as a keyboard or a mouse. The set of signals provided by user input means can therefore include data indicating mouse operation and data indicating keyboard operation.

An "image" is a pattern of light. An "image output device" is a device that can provide output defining an image. A "display" is an image output device that provides output that defines an image in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A wide variety of display techniques for data processing systems are available including, for example, various graphical user interfaces, but, despite their diversity, these techniques have certain common characteristics. One fundamental common characteristic is that a display produces human perceptions. In this application, the term "display feature" refers to any human perception produced by a display.

A "display object" or "object" is a display feature that is perceptible as a coherent unity. An "object surface" or "surface" is a display feature that is perceptible as a surface of a display object; for example, the outer boundary of a three-dimensional display object is a surface. A "region" on a surface is a bounded area of the surface; for example, a single point is the smallest possible region of any surface. A "shape" is a display object that has a distinguishable outline; for example, a circular display object is a shape.

An image "includes" an object, a surface, a region, or a shape if presentation of the image can produce perception of the object, surface, region, or shape.

A "workspace" is perceived when objects or other display features in an image are perceived as having positions in a space. A "three-dimensional workspace" is a workspace that is perceptible as extending in three orthogonal dimensions. Typically, a display has a two-dimensional display surface and the perception of a third dimension is produced by visual clues such as perspective lines extending toward a vanishing point; obscuring of distant objects by near objects; size changes in objects moving toward or away from the viewer; perspective shaping of objects; different shading of objects at different distances from the viewer; and so forth. Three-dimensional workspaces include not only workspaces in which all of these cues combine to produce the perception of three dimensions, but also workspaces in which a single cue can produce the perception of three dimensions. For example, a workspace with overlapping display objects or a workspace within which a view can zoom in on an object can be a three-dimensional workspace even though objects within it are presented in orthographic projection, without perspective.

A three-dimensional workspace is typically perceived as being viewed from a position within the workspace, and this position is the "viewpoint." The viewpoint's "direction of orientation" is the direction from the viewpoint into the field of view along the axis at the center of the field of view.

In order to present a three-dimensional workspace, a system may store data indicating "coordinates" of the position of an object, a viewpoint, or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

A signal from a user input device "indicates" a region of a surface if the signal includes data from which the region can be identified. For example, if a signal includes data indicating a mouse pointer displacement, a system can find a point in the display plane based on the previous pointer position. This point can then be used to project a ray from the viewpoint into the three-dimensional workspace being presented, and the coordinates of display features can be used to find the nearest display feature intersected by the ray. The point or a set of points at the intersection can thus be identified as the region.

A "normal" within a region on a surface is a line that intersects the surface within the region at a right angle. For example, the "horizontal normal" can be defined as a line in a plane parallel to the x-z coordinate plane that is perpendicular to the boundary of the surface in the plane.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

An "animation loop" is a repeated operation in which each repetition presents an image and in which objects and other display features in each image appear to be continuations of objects and display features in the next preceding image. If the user is providing signals through a user input means, the signals can be queued as events and each loop can handle some events from the queue.

A second display feature is perceptible as a "moved continuation" or a "displaced continuation" of a first display feature if it is perceptible as a continuation in a different position. The first display feature is perceived as "moving" or as having "movement" or "motion" or as being "displaced" within a workspace.

"Viewpoint motion" or "viewpoint displacement" occurs when a sequence of images is presented that are perceptible as views of a three-dimensional workspace from a moving or displaced viewpoint. This perception may result from perception of objects in the workspace as continuations. Viewpoint motion is "relative" to a point or other region of the image if the viewpoint is perceived as moving with respect to the point or other region. A "point of interest" or "POI" is a point indicated by the user and relative to which the viewpoint can move.

A "displacement" is a distance by which a feature or the viewpoint is perceived as being displaced within a workspace.

"Radial motion" or "radial displacement" is perceived as motion or displacement along one or more rays. A ray extends from a "radial source."

The viewpoint can move or be displaced radially toward or away from a radial source in a three-dimensional space, and the radial source can be a POI.

"Lateral motion" or "lateral displacement" is perceived as motion or displacement in a direction lateral to one or more rays. The viewpoint can move or be displaced laterally in a direction perpendicular to a ray extending from a POI, for example, and the lateral motion can be toward a normal of the POI.

The viewpoint's direction of orientation "shifts" when it changes by some angle, referred to as a "shift angle." The direction of orientation can shift without viewpoint motion. For example, the direction of orientation can shift by an angle that brings a POI closer to the center of the field of view.

Signals from user input means can request motion of the viewpoint and motion of the POI. If the user can request viewpoint and POI motion separately and can request both types of motion simultaneously, the user input means is structured so that the use can request viewpoint motion and POI motion "independently." For example, the user can operate a mouse or other pointing device to request POI motion with one hand and can independently operate keys on a keyboard to request viewpoint motion with the other hand.

A moving viewpoint is perceived as following or defining a "path" within a workspace. An "asymptotic path" is a path on which the perceived velocity decreases such that the path approaches but does not reach an asymptote.

When the viewpoint is perceived as following an asymptotic path, the displacements between successive positions follow an "asymptotic function." An example of an asymptotic function is a function in which a logarithm approaches zero asymptotically as time increases. The term "logarithmic function" includes such functions as well as functions that approximate them.

A "function of a distance" between two points or positions is a function that produces, for each of a set of distances, a set of respective values. For example, one simple logarithmic function of the distance between two points or positions can be obtained by taking a "proportion" of the distance, meaning a part of the distance that is greater than zero but less than the entire distance. A proportion of a distance can be obtained by multiplying the distance by a "proportionality constant," with the proportionality constant having a magnitude greater than zero and less than one. Another example of a function of a distance between first and second points is a function that finds a third point that is at the same distance from the first point as the second point is.

A "function of a position" is a function that produces, for each of a set of positions, a set of respective values. For example, one simple logarithmic function of a position is a logarithmic function of the distance between the position and another position, as described above in relation to a function of a distance.

B. General Features

Figure 2A:
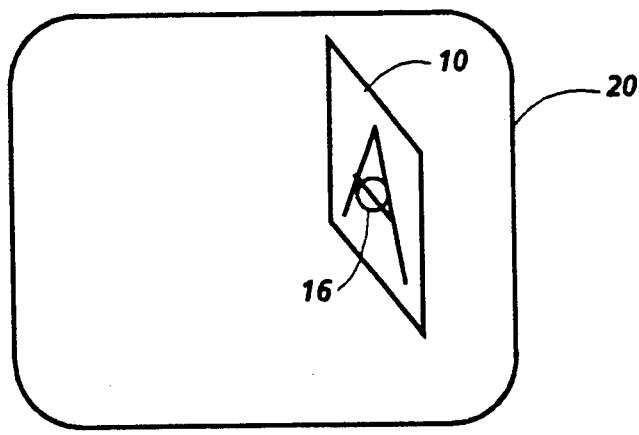
FIG. 2A is a schematic view of a presented image that includes the surface shown in FIG. 1.
Figure 2B:
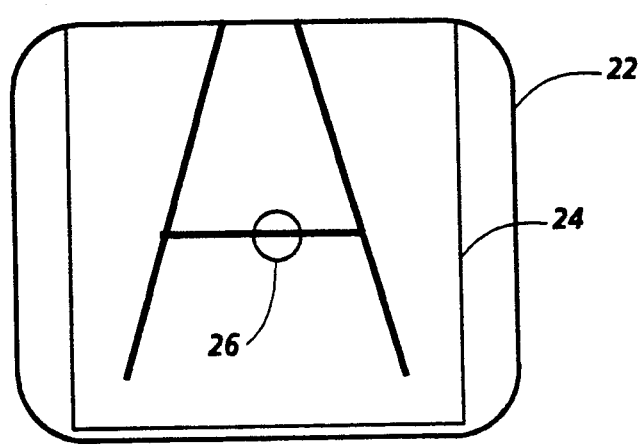
FIG. 2B is a schematic view of another presented image that includes a surface that is perceptible as a continuation of the surface of FIG. 2A viewed from a different viewpoint.
Figure 3:
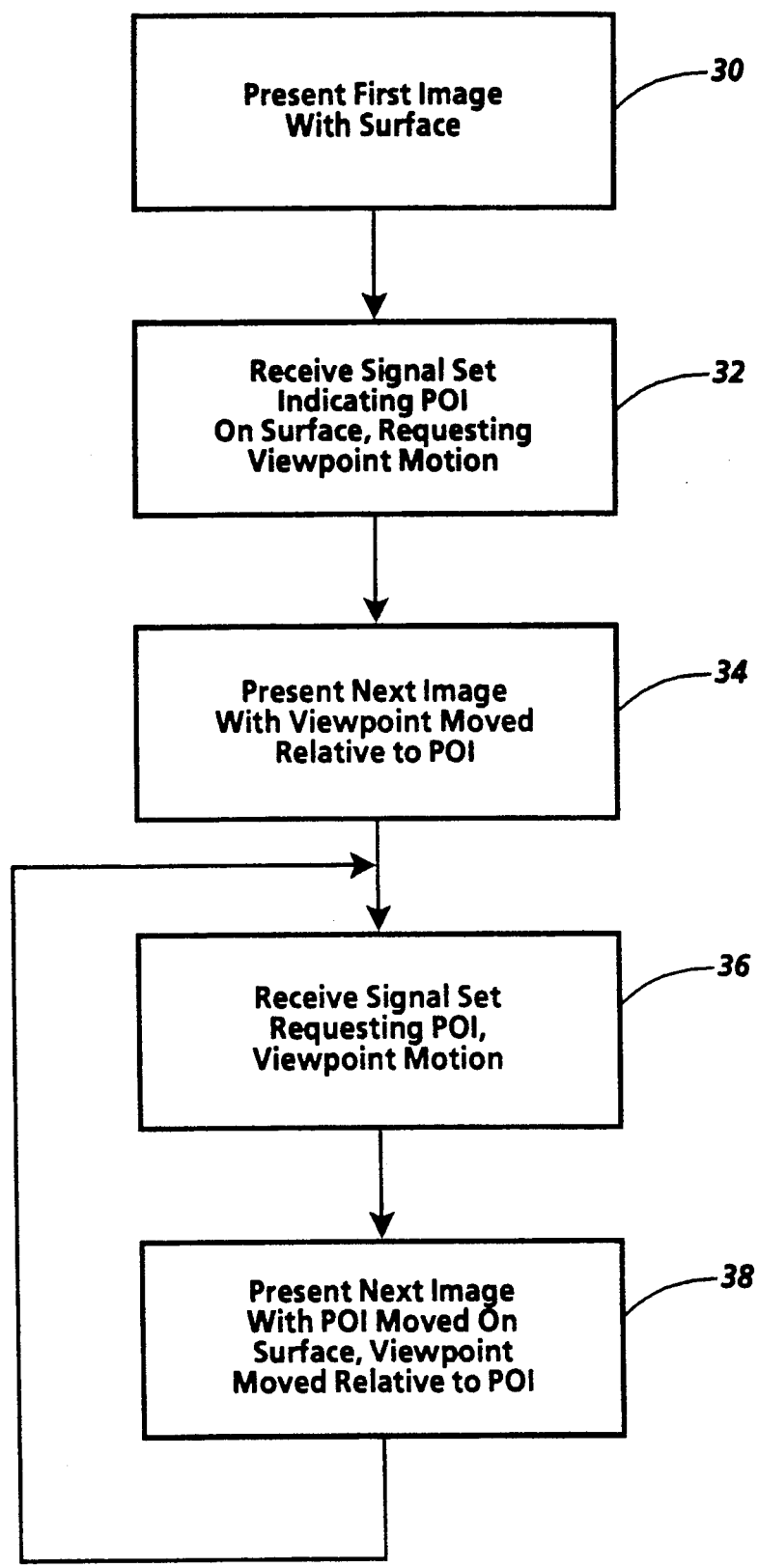
FIG. 3 is a flow chart showing general steps in viewpoint motion.
Figure 4A:
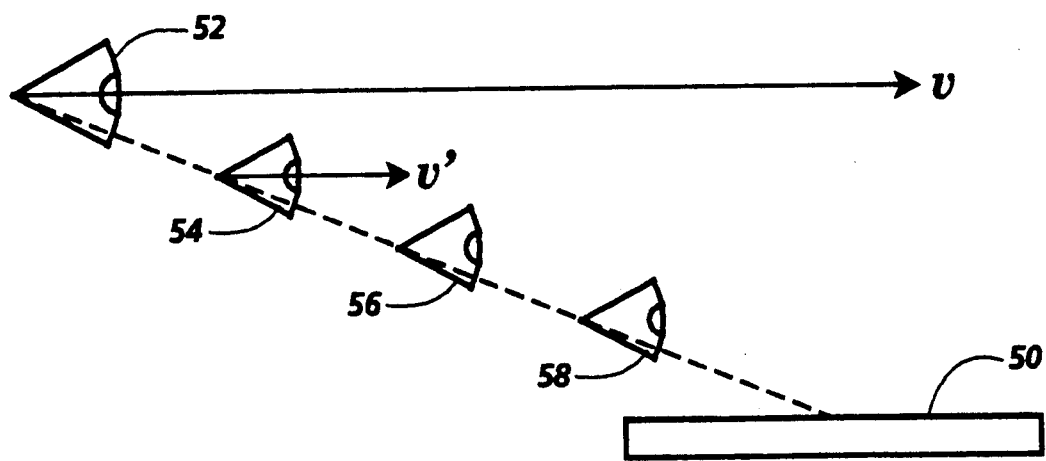
FIG. 4A is a plane view showing radial viewpoint motion toward a point on a surface without centering.
Figure 4B:
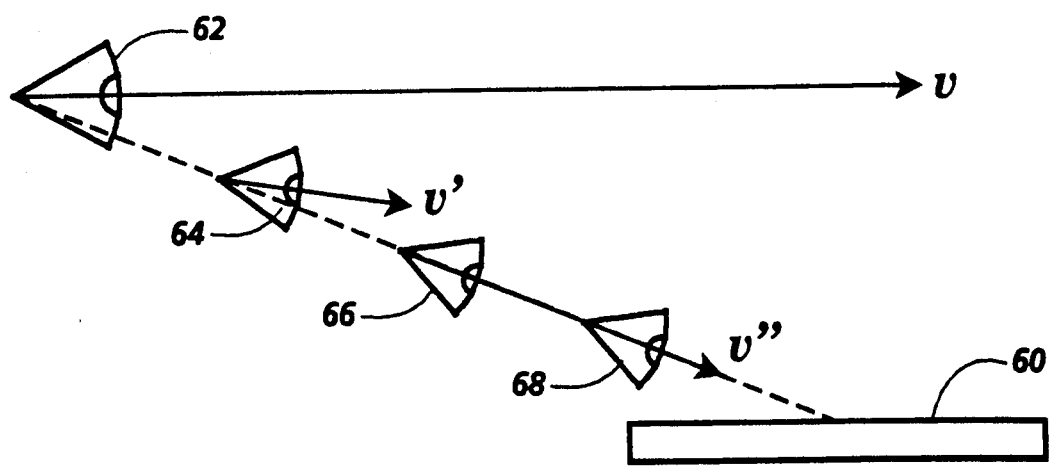
FIG. 4B is a plane view showing radial viewpoint motion toward a point on a surface with centering.
Figure 5:
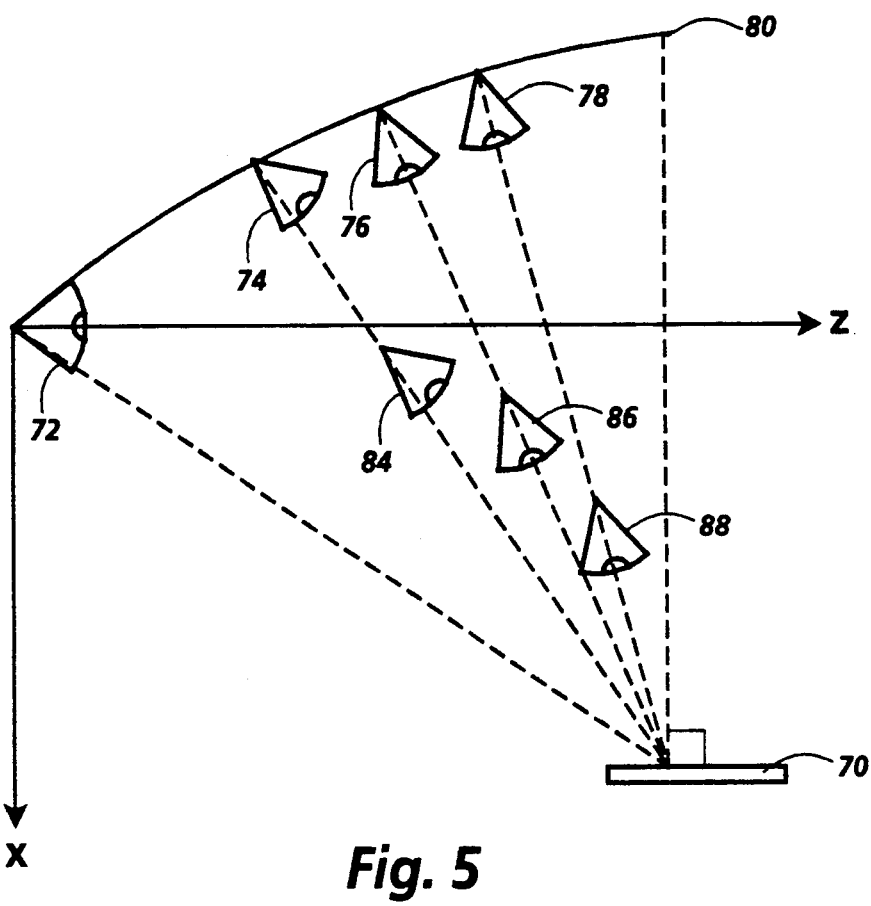
FIG. 5 is a plane view showing lateral viewpoint motion with viewpoint rotation and also showing viewpoint motion that includes lateral and radial components.
Figure 7:
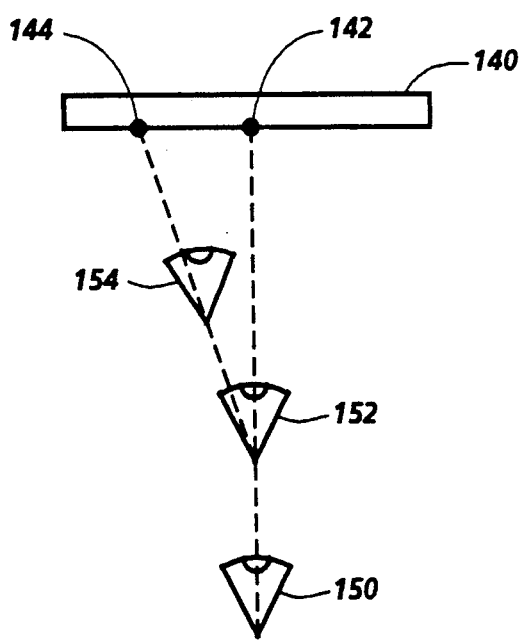
FIG. 7 is a plane view showing viewpoint motion with point of interest motion.
Figure 6:
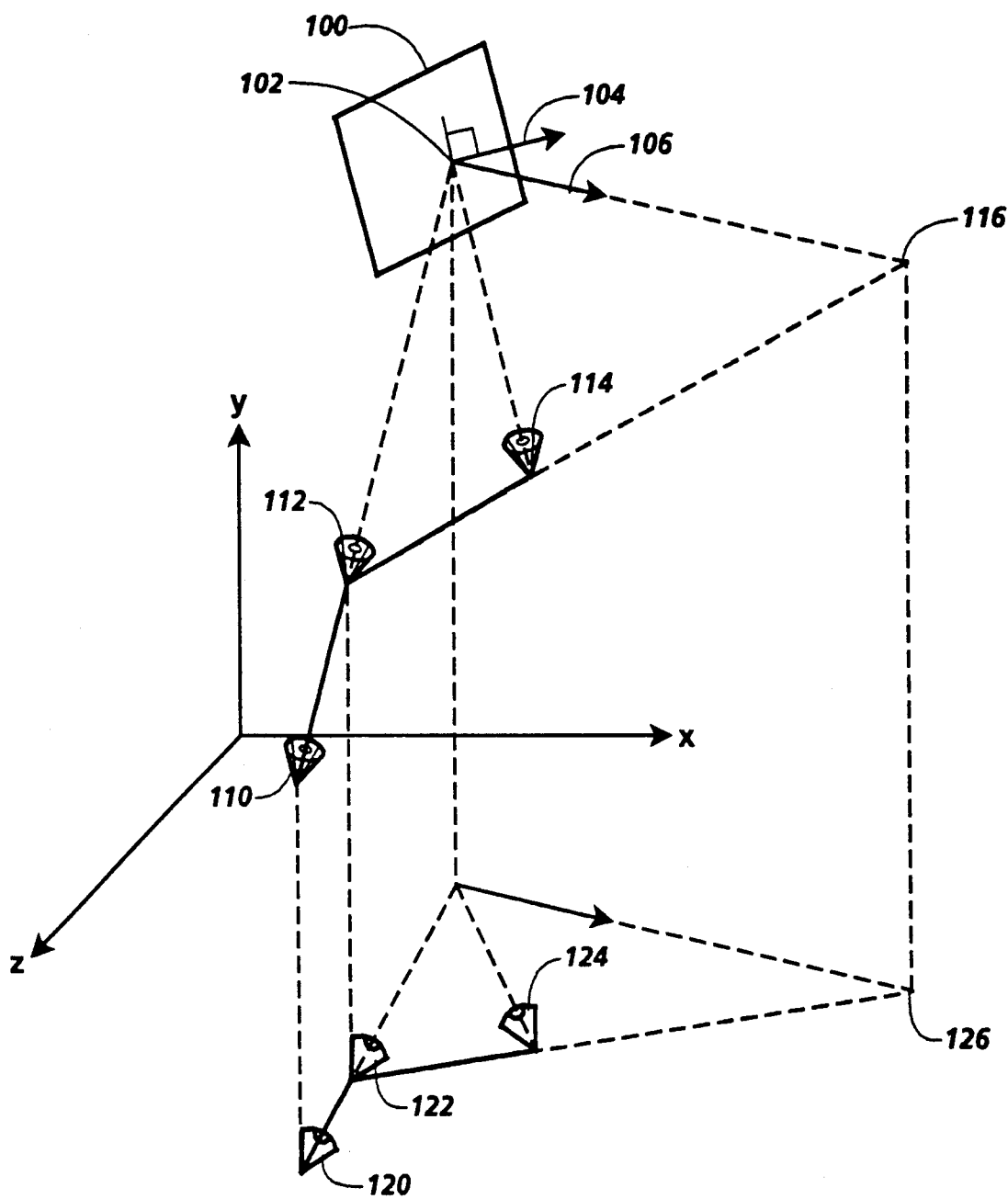
FIG. 6 is a three-dimensional view showing viewpoint motion that includes lateral and radial components.
Figure 8:
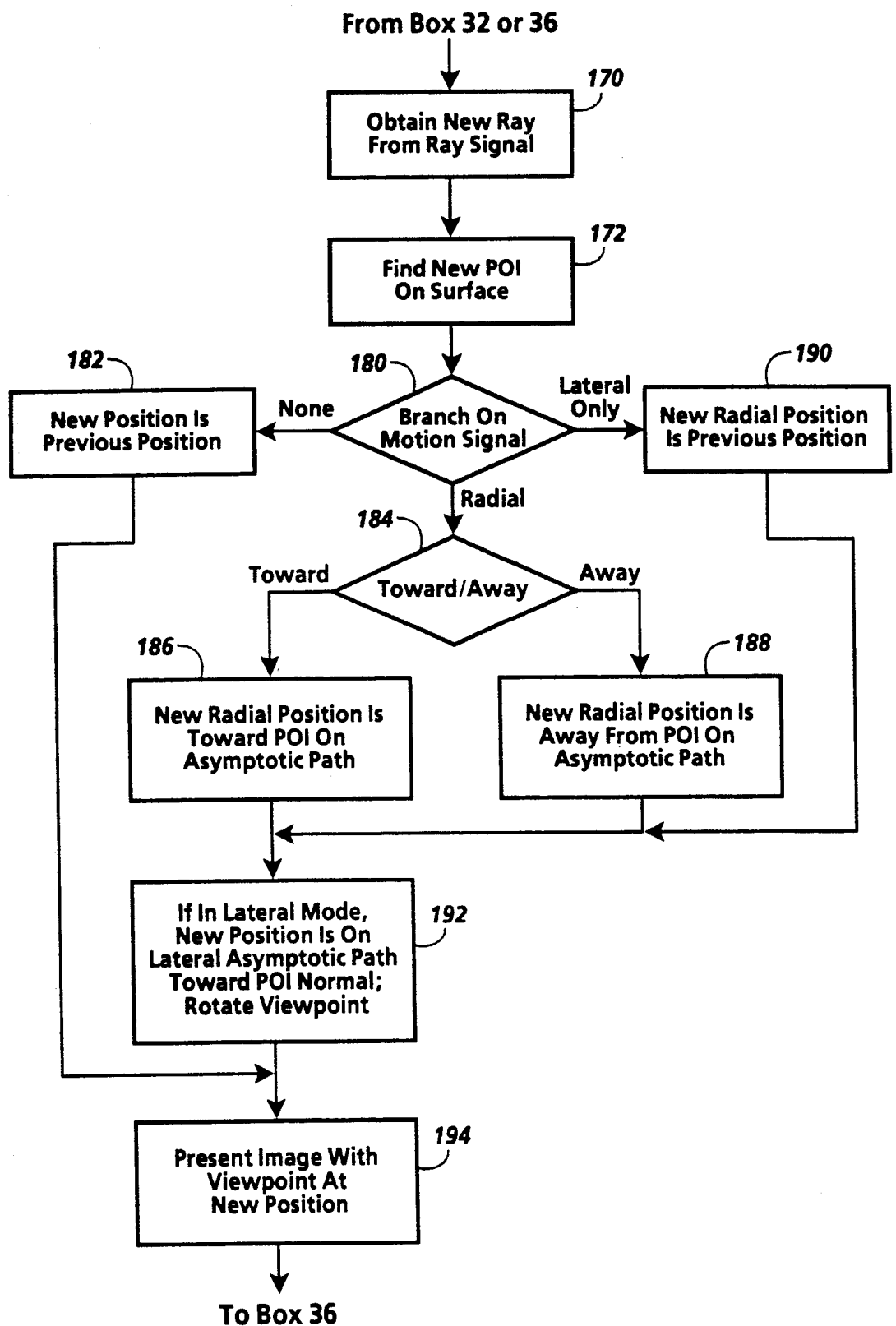
FIG. 8 is a flow chart showing general steps in presenting a three-dimensional workspace from a new viewpoint in response to a request for viewpoint motion and point of interest motion.

FIGS. 1–8 illustrate general features of the invention. FIG. 1 shows a surface perceptible in a three-dimensional workspace. FIGS. 2A and 2B show images before and after viewpoint motion. FIG. 3 is a flow chart showing general steps in presenting a sequence of images with viewpoint motion. FIGS. 4A and 4B are plane views showing radial viewpoint motion along an asymptotic path toward a point of interest on a surface, with FIG. 4B also showing a centering operation. FIG. 5 is a plane view showing lateral viewpoint motion along an asymptotic path that follows an arc and also showing viewpoint motion that includes both radial and lateral motion. FIG. 6 is a three-dimensional view showing viewpoint motion that includes both radial and lateral motion, illustrating lateral motion along an asymptotic path that follows a chord. FIG. 7 is a plane view showing radial viewpoint motion with point of interest motion on a surface. FIG. 8 is a flow chart showing steps in viewpoint motion and adjustment of the point's position on the surface.

FIG. 1 shows surface 10, perceptible as being viewed from viewpoint 14 in a three-dimensional workspace. Viewpoint 14 is shown at the origin of a coordinate system, oriented with its axis of viewing along the z axis. A dashed line extends from viewpoint 14 to point 16 on surface 10. Point 16 is indicated by a circle whose position can be controlled by a user input device such as a mouse.

FIG. 2A shows image 20, within which surface 10 is perceptible as viewed from viewpoint 14 in a three-dimensional workspace. FIG. 2B shows image 22, with surface 24 including point 26 in a circle. By presenting an appropriate sequence of images, surface 24 can be perceptible as a continuation of surface 10 but viewed from a different viewpoint in the three-dimensional workspace. When a user indicates point 16 and requests viewpoint movement toward point 16, a system presenting image 20 can respond with a sequence of images ending in image 22 so that the user can see point 26, perceptible as a continuation of point 16, and the surrounding area in greater detail.

FIG. 3 shows general steps a system can perform in presenting such a sequence. The step in box 30 presents the first image of the sequence, including a surface that is perceptible in a three-dimensional workspace. The step in box 32 receives a signal set from a user input device indicating a POI on the surface and requesting viewpoint motion relative to the POI. In response, the step in box 34 presents an image that is perceptible as a view with the viewpoint moved relative to the POI. The image presented in box 34 includes a surface that is perceptible as a continuation of the surface presented in box 30. The step in box 36 receives another signal set, this time requesting both POI and viewpoint motion. The step in box 38 responds by presenting an image that is perceptible as a view with the POI moved and with the viewpoint moved relative to the POI. The image presented in box 38 includes a surface that is perceptible as a continuation of the surface presented in box 30 and the moved POI is perceptible as a moved continuation of the previous POI, with the POI motion occurring on the surface. The steps in boxes 36 and 38 can be repeated until a satisfactory image is obtained.

FIG. 4A illustrates a technique for moving a viewpoint radially toward an indicated POI on surface 50. Viewpoint 52 is the first in a sequence of viewpoint positions and is oriented with its direction of view along the v axis, an axis defined as the initial direction of view, with its origin at viewpoint 52. In FIG. 4A, the ray along which radial motion occurs extends from the viewpoint through a POI on surface 50.

In response to a first signal requesting viewpoint motion toward the POI, an image is presented showing object 50 from viewpoint 54, displaced from viewpoint 52 along the ray from viewpoint 52 through the POI. Viewpoint 54 can be displaced toward the POI by a distance that is a proportion of the distance from viewpoint 52 to the POI.

Similarly, in response to second and third signals requesting further viewpoint motion toward the same POI, images can be presented from viewpoints 56 and 58, displaced along the ray toward the POI by the same proportion. Furthermore, in response to a fourth signal requesting viewpoint motion away from the POI, the viewpoint could be displaced from viewpoint 58 to viewpoint 56, retracing the path followed in approaching the POI.

Viewpoint motion as in FIG. 4A follows an asymptotic path, because the path approaches but does not reach the POI. Specifically, POI approach along the asymptotic path is initially rapid and then progressively slower, allowing the user to control motion more easily as the POI is viewed at closer range.

FIG. 4A also illustrates why radial POI approach is not sufficient for satisfactory viewing of the POI: As shown for viewpoint 54, with its direction of view along axis v' parallel to axis v, the direction of view does not change during radial POI approach. When viewed from viewpoints 54, 56, and 58, surface 50 is perceptibly closer than from viewpoint 52, but it is poorly oriented for viewing and the POI remains at the periphery of the field of view.

FIG. 4B illustrates how viewpoint centering can be combined with radial POI approach to provide satisfactory viewing of the POI. Surface 60 and viewpoint 62 correspond to surface 50 and viewpoint 52 in FIG. 4A. Viewpoint 64 corresponds to viewpoint 54, but is partially rotated toward the POI so that the POI is nearer to the center of the field of view. The direction of view of viewpoint 64 is along axis v' which, rather than being parallel to axis v, is at an angle between axis v and the ray from viewpoint 64 to the POI. Viewpoint 66 corresponds to viewpoint 56, but is fully rotated toward the POI so that the POI is at the center of the field of view. Viewpoint 68, corresponding to viewpoint 58, is not rotated any further, so that the POI remains at the center of the field of view. The directions of view of viewpoints 66 and 68 are along axis v" which is not parallel to axis v or to axis v', but rather is along the ray from each viewpoint to the POI.

The centering illustrated in FIG. 4B can be achieved by determining, at each step, the remaining angle between the direction of gaze and the ray to the POI. If the remaining angle exceeds a maximum single step rotation, the viewpoint is rotated by the single step rotation. Otherwise the viewpoint is rotated by the full remaining angle.

FIG. 5 shows how lateral viewpoint motion and viewpoint rotation can be combined with viewpoint approach to obtain satisfactory POI viewing. Object 70 is initially viewed from viewpoint 72, with direction of view illustratively along the z axis as shown.

Lateral viewpoint motion with rotation but without radial motion is illustrated by viewpoints 74, 76, and 78, each displaced toward point 80, which is positioned on the horizontal normal to the POI on surface 70 and, in this special case, is in the same x-z plane as viewpoint 72 and the POI; in the general case, as described below in relation to FIG. 6, the viewpoint is not in the same plane as the POI, so that lateral motion also includes a y component. Viewpoint rotation in the x-z plane maintains the viewer's sense of the vertical. The lateral displacements in FIG. 5 are illustratively along an arc, and follow an asymptotic path.

Viewpoints 74, 76, and 78 also illustrate viewpoint rotation. The direction of view of each of these viewpoints is rotated from the previous viewpoint to keep the POI in the field of view. The viewpoint rotation also includes viewpoint centering as described in relation to FIG. 4, which brings the POI to the center of the field of view, as shown.

Lateral viewpoint motion with rotation and with radial motion is illustrated by viewpoints 84, 86, and 88.

This sequence of viewpoints could occur, for example, if initial viewpoint 72 is in the same x-z plane as the POI and if the POI is not moved during viewpoint motion. In this case, radial viewpoint motion occurs in the same plane as lateral viewpoint motion. In effect, radial and lateral motion components can be combined to provide the viewpoint motion illustrated by viewpoints 84, 86 and 88. The rate of lateral motion can be sufficiently greater than the rate of approach motion that the viewpoint approaches the normal before it approaches the surface, allowing the user to adjust the distance from the surface along the normal.

FIG. 6 illustrates another example of viewpoint motion that includes radial motion, lateral motion, and viewpoint centering. Surface 100 is perceptible in a three-dimensional workspace. At POI 102, surface 100 has normal 104, and horizontal normal 106 is the projection of normal 104 onto a horizontal plane that includes POI 102.

In response to a signal requesting viewpoint motion from initial viewpoint 110 toward POI 102, coordinates of intermediate viewpoint 112 are found and used in obtaining coordinates of ending viewpoint 114. In other words, the viewpoint moves from initial viewpoint 110 to ending viewpoint 114 in a single step, with intermediate viewpoint 112 being used for computational purposes.

The coordinates of intermediate viewpoint 112 are found through a radial displacement from initial viewpoint 110 along the ray from POI 102 through initial viewpoint 110. Initial viewpoint 110 is below the horizontal plane that includes POI 102, so that the radial displacement includes x, y, and z components.

The coordinates of ending viewpoint 114 are found through a lateral displacement from intermediate viewpoint 112 along a chord. As shown, the chord can connect intermediate viewpoint 112 and normal point 116, a point on horizontal normal 106 which is at the same distance from POI 102 as intermediate viewpoint 112; alternatively, lateral displacement could be along a chord connecting intermediate viewpoint 112 to a point on normal 104 or along an arc as in FIG. 5.

FIG. 6 shows the projection of viewpoints 110, 112, and 114 and of normal point 116 onto the x-z plane to illustrate how the lateral displacement can be obtained. After the coordinates of intermediate viewpoint 112 are obtained, projection 120 of initial viewpoint 110 is not involved in the computation of lateral displacement. Projection 122 of intermediate viewpoint 112 and projection 126 of point 116 are the endpoints of a projected chord. Projection 124 of ending viewpoint 114 is on the chord, offset from projection 122 by a proportion of the chord. The x and z offsets from projection 122 to projection 124 are the same as the x and z components of the lateral displacement from viewpoint 112 to viewpoint 114.

The y component of the lateral displacement bears the same proportion to the y offset between viewpoint 112 and normal point 116 as the x and z components bear to the x and z offsets. In obtaining the y component, however, a test may be done to determine whether normal 104 at POI 102 is parallel or nearly parallel to the y axis. If not, the lateral displacement can be applied using the x, y, and z components as described above. But if normal 104 is parallel to the y axis, it may be preferable not to apply a lateral displacement—instead, viewpoint motion can be limited to radial motion and rotation of the viewpoint to bring the POI toward the center of the field of view. This avoids the possibility of a view directly downward or directly upward.

If the same proportion is used for each of a series of steps, the lateral motion follows an asymptotic path. The function used to obtain the lateral displacement at each step is a logarithmic function. A similar function could be applied to lateral motion along an arc, as in FIG. 5.

FIG. 7 illustrates viewpoint motion together with point of interest motion. Surface 140 is perceptible in a three-dimensional workspace, and includes POI 142 and POI 144. From initial viewpoint 150, radial motion is requested toward POI 142, so that an image is presented from viewpoint 152 on the ray from POI 142 through viewpoint 150. Then, while the request for radial motion toward the POI continues, a request to move to POI 144 is also received, so that an image is presented from viewpoint 154 on the ray from POI 144 through viewpoint 152.

FIG. 8 shows steps that can be performed within the steps in boxes 34 and 38 in FIG. 3 to provide viewpoint motion as illustrated in FIGS. 4-7. The step in box 170 begins by obtaining a new ray from a user signal, which can be received in the steps in boxes 32 and 36 in FIG. 3 from a mouse or other user input device that can indicate a ray in a three-dimensional workspace. The new ray can be indicated by a unit vector with the same source as the previous ray, for example, and will ordinarily be close to the direction of the previous ray because movement of a mechanical pointing device by a user is relatively slow compared to the speed of computation.

The step in box 172 finds a new POI by finding the intersection of the new ray and the surface of a selected object. If the new ray does not intersect the surface of the selected object, the new POI can be the point on the object's surface that is closest to the new ray; the new POI could alternatively be kept within the previously selected object's surface by mapping the two-dimensional signal onto the surface rather than onto the entire display surface, so that the ray would always intersect the surface. In the step in box 32 in FIG. 3, the signal set includes an indication of a newly selected object. In the step in box 36, the selected object is the previously selected object.

The step in box 180 branches based on a signal selecting a type of viewpoint motion, which can be received in the steps in boxes 32 and 36 in FIG. 3 from keys on a keyboard or mouse. If the signal selects no viewpoint motion, the step in box 182 takes the previous position as the new position. If the signal selects viewpoint motion toward or away from the POI, the step in box 184 branches based on whether the requested motion is toward or away from the POI. If toward the POI, the step in box 186 takes as the new radial position the next position toward the POI on an asymptotic path. If away from the POI, the step in box 188 takes as the new radial position the next position away from the POI on the asymptotic path. If the signal selects lateral motion only, the step in box 190 takes the previous position as the new radial position.

When the new radial position has been obtained, and if the system is in a mode that includes lateral motion, the step in box 192 takes as the new position the next position on a lateral asymptotic path from the new radial position toward the POI normal. This step also rotates the viewpoint as appropriate, including centering. If the system is not in the lateral mode, the new position is the new radial position from box 186, box 188, or box 190.

Finally, the step in box 194 presents an image in which the object is perceptible as viewed from a viewpoint at the new position from box 182 or box 192. Then the system returns to box 36 for the next step of viewpoint motion.

C. An Implementation

The invention could be implemented on various data processing systems. It has been successfully implemented on a Silicon Graphics Iris workstation that includes the graphics engine option.

1. The System

Figure 9:
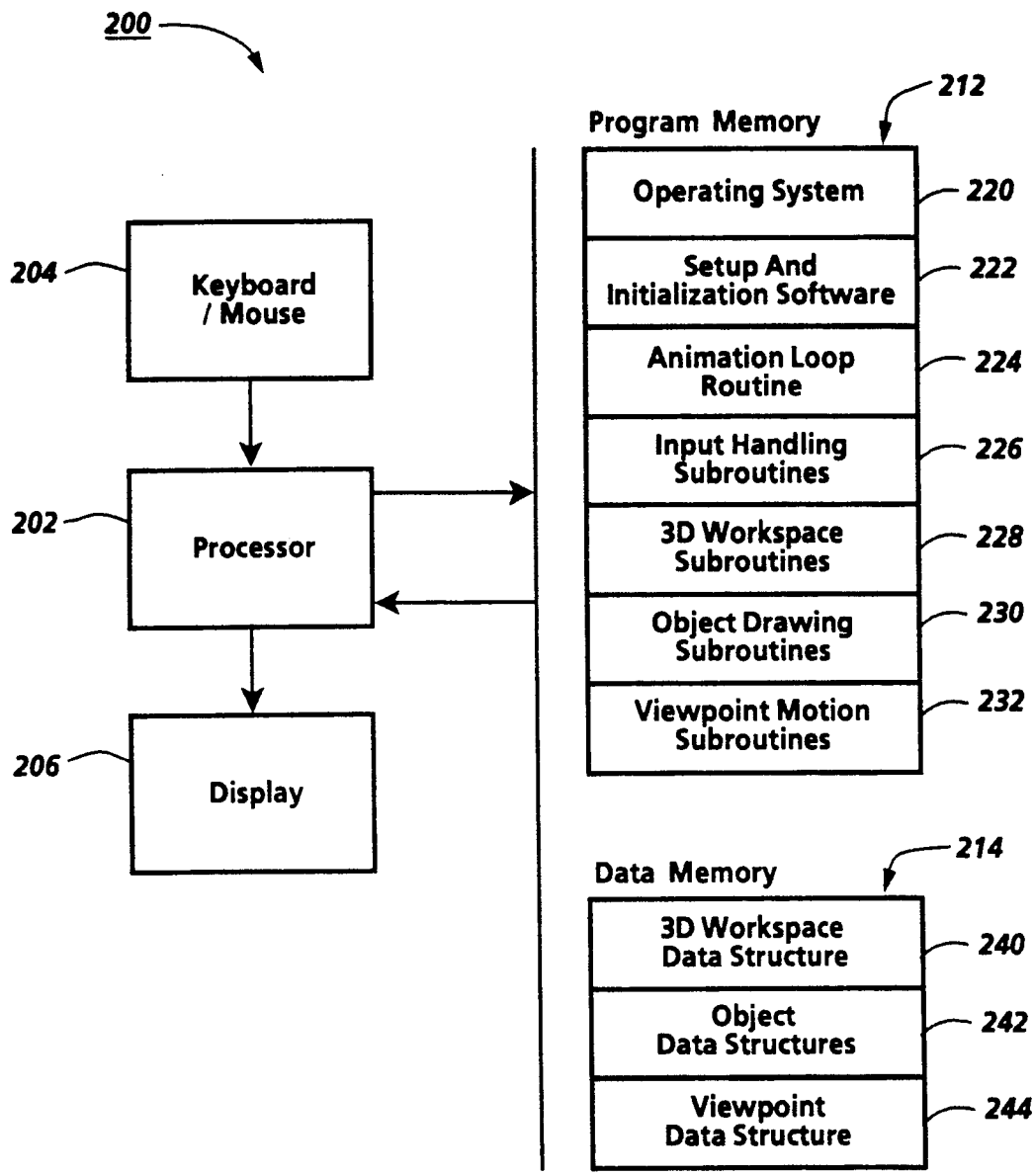
FIG. 9 is a block diagram showing components in a system that provides viewpoint motion and point of interest motion.

FIG. 9 shows components of a system implementing the invention, including relevant items in memory. System 200 includes processor 202 which is connected for receiving input signals from keyboard and mouse 204 and for presenting images on display 206. Processor 202 operates by accessing program memory 212 to retrieve instructions, which it then executes. During execution of instructions, processor 202 may access data memory 214, in addition to receiving input signals and presenting images.

Program memory 212 includes operating system 220, which includes instructions for performing graphics operations, all of which is part of the Silicon Graphics Iris workstation with graphics engine. In preparation for an interactive session, processor 202 executes setup and initialization software 222. In the current implementation, processor 202 is set up to execute Common Lisp and Common Lisp Object System code and is initialized with parameters, several of which are mentioned below. The other routines in program memory 212 in FIG. 9 are implemented with Common Lisp Object System classes and methods.

In response to an appropriate call, processor 202 executes animation loop routine 224, which includes a loop that continues until terminated by an appropriate signal from keyboard and mouse 204. Each cycle of the loop can use double buffer techniques to present a respective image on display 206, with the respective images together forming a sequence such that display features in each image appear to be continuations of display features in the previous image in accordance with object constancy techniques.

Each animation cycle includes a call to input handling subroutines 226 to receive and handle the next item on a FIFO event queue maintained by operating system 220. The event queue includes signals from the user such as keystrokes, mouse events, mouse pointer movement into or out of a window, and mouse pointer movement reshaping or moving a window, and can also include events from other sources such as from another process.

Each animation cycle also includes a call to viewpoint motion subroutines 232 to determine the current position of the viewpoint. Then the animation cycle calls 3D workspace subroutines 228 to redraw the three-dimensional workspace. In redrawing the workspace, 3D workspace subroutines 228 call object drawing subroutines 230 to redraw each object in the workspace.

Data memory 214 includes 3D workspace data structure 240, object data structures 242, viewpoint data structure 244, as well as other data stored and accessed during execution of instructions in program memory 212. 3D workspace data structure 240 can include a list of objects in the workspace and data indicating the extent of the workspace. Object data structures 242 can include, for each object, type data indicating its geometric shape, coordinate data indicating a position within the three-dimensional workspace, extent data indicating a region such as a cube or sphere that includes the object, and a list of other objects that are attached to the object, if any. Viewpoint data structure 244 can include coordinate data indicating a position of the viewpoint within the three-dimensional workspace, data indicating a direction of gaze, and data indicating a direction of body. Together, workspace data structure 240, object data structures 242, and viewpoint data structure 244 provide a model of the workspace and its contents.

2. The Animation Loop

Figure 10:
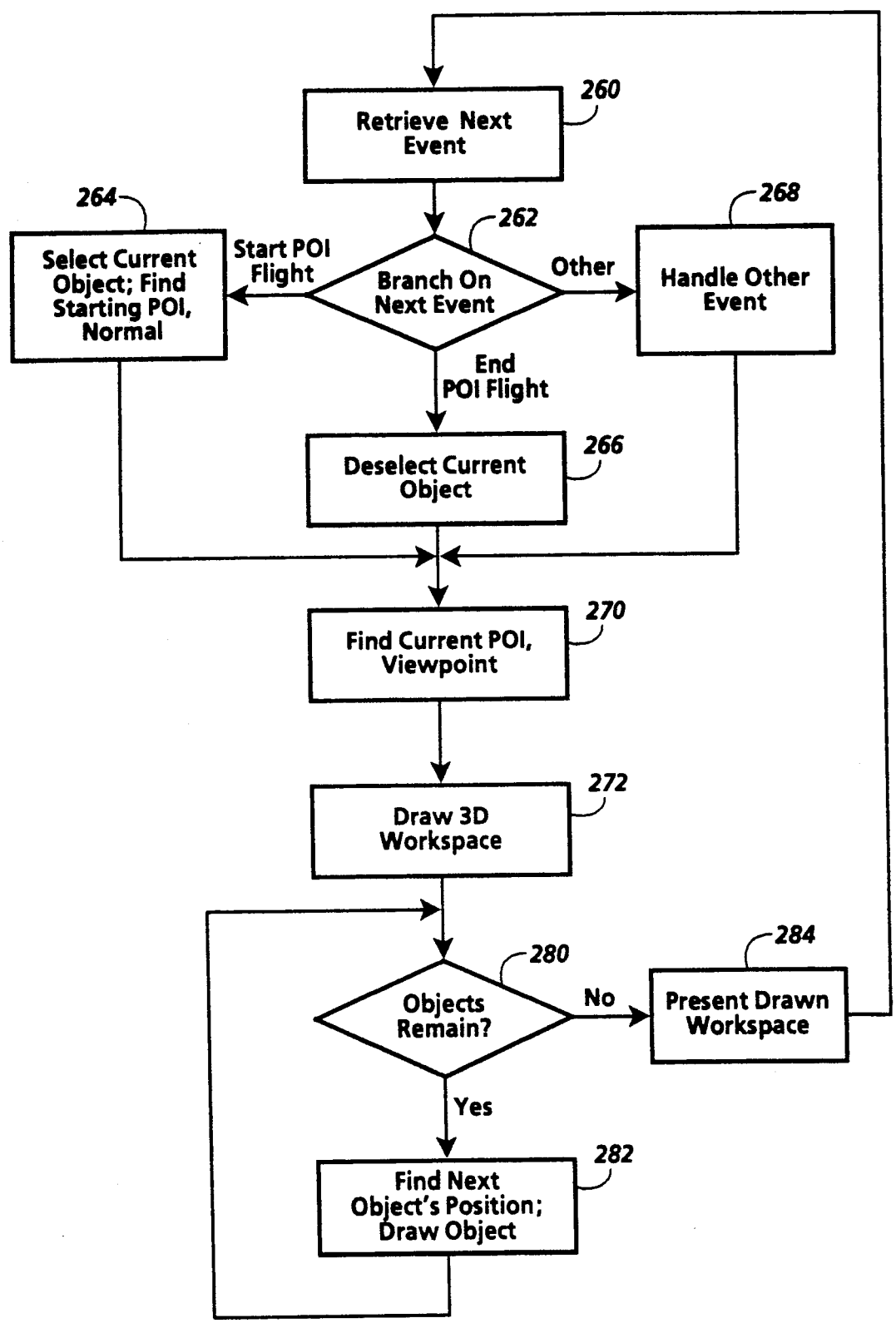
FIG. 10 is a flow chart showing steps in an animation loop that provides viewpoint motion and point of interest motion.

Animation loop routine 224 could be implemented in various ways. FIG. 10 shows relevant steps of an animation loop executed in the current implementation of the invention.

The step in box 260 retrieves the next event from the event queue for handling. The step in box 262 branches based on the next event. If the next event is a signal requesting start of POI flight, implemented as a middle mouse button down click, the step in box 264 performs a pick operation to find the object currently pointed to; sets a current selection variable to indicate that the object pointed to is currently selected; finds the starting POI and, if the selected object is planar, the normal at the POI; and performs other appropriate operations for the newly selected object. The step in box 264 can include accessing object data structures 242 to retrieve coordinate data indicating an object's position. On the other hand, if the next event is a signal requesting end of POI flight, implemented as a middle mouse button up click, the step in box 266 resets the current selection variable to indicate that the object is no longer currently selected. If the next event is another signal, it is handled appropriately in box 268. The step in box 268 may include storing data indicating a key click or other input signal received.

The step in box 270 finds the current POI and viewpoint position for use in redrawing the workspace and objects, as discussed in greater detail below. In the simplest case, the viewpoint does not move, so that coordinate data indicating the previous viewpoint position can be retrieved by accessing viewpoint data structure 244.

The step in box 272 draws the three-dimensional workspace for viewing from the current viewpoint. This step can draw the workspace with various cues to promote the perception of three dimensions, including corners, shading, and other visual cues to indicate walls, a ceiling, and a floor. This step can include accessing workspace data structure 240 to retrieve data indicating the extent of the workspace.

The step in box 280 begins an iterative loop that draws each object. As noted above, workspace data structure 240 includes a list of the objects in the workspace, and this list can be followed by the iterative loop. The step in box 282 performs operations to find the position of the next object on the list and to draw the object at its position. Object data structures 242 can be accessed to retrieve data for each object. The currently selected object can be drawn with a POI circle on the appropriate object's closest surface, centered on the POI. The step in box 280 may include techniques like those described in copending, coassigned U.S. patent application Ser. No. 07/562,048, entitled "Moving an Object in a Three-Dimensional Workspace," incorporated herein by reference.

When all the objects have been drawn, the step in box 284 switches buffers so that the workspace and objects drawn in boxes 272 and 282 are presented on display 206. Then, the loop returns to its beginning.

The animation loop can include various additional operations. For example, if the viewpoint is moved into a position so that it bumps against a wall of the workspace, the view of the workspace can be greyed to give a visual cue.

3. Finding POI

Figure 11:
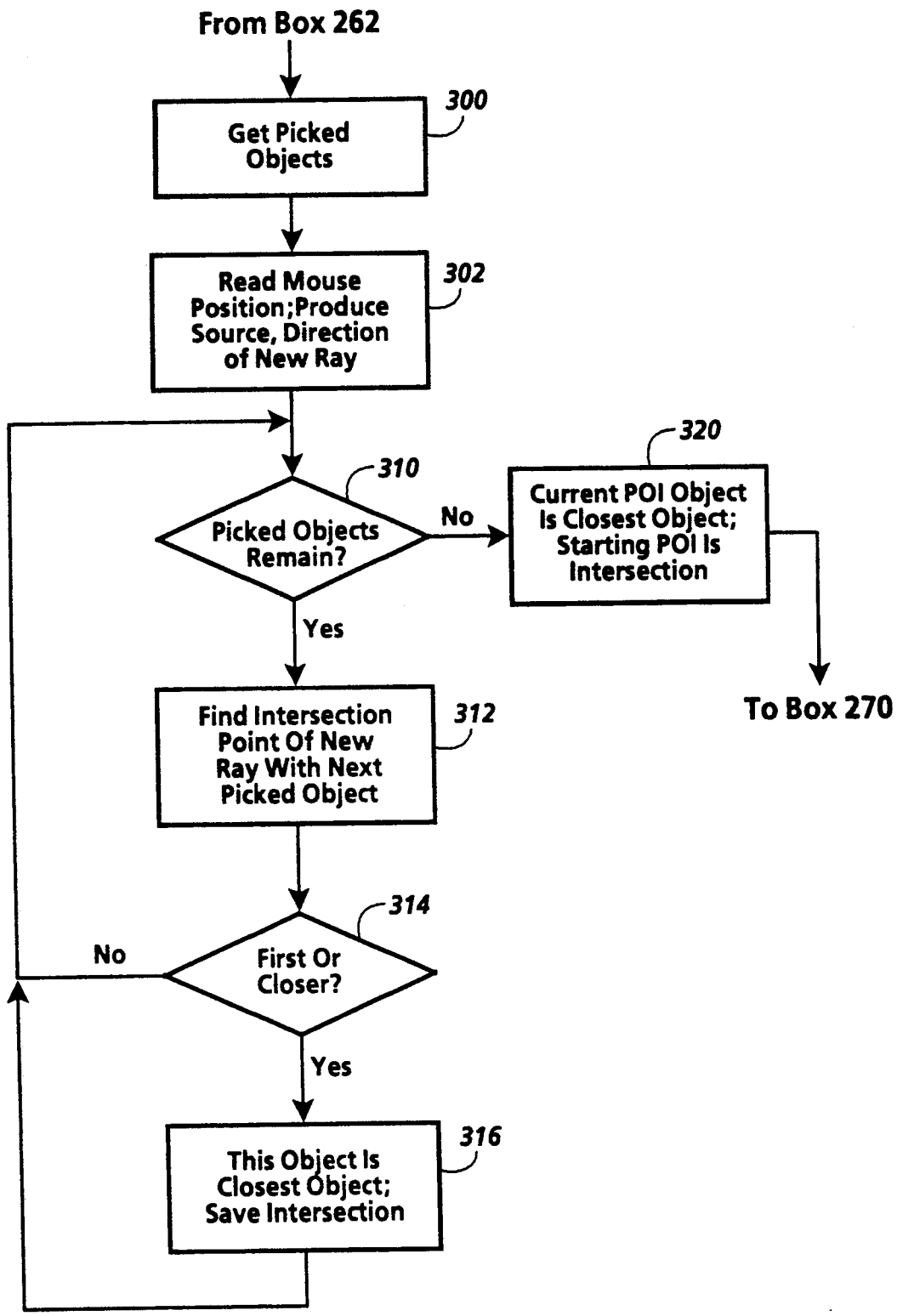
FIG. 11 is a flow chart showing steps in finding a starting point of interest in FIG. 10.

The step in box 264 in FIG. 10 could be implemented in various ways. FIG. 11 shows general steps in finding the starting POI.

The step in box 300 begins by getting a set of picked objects. On the Silicon Graphics workstation, the pick and endpick functions can be used to determine whether rendered objects extend into a picking area; objects that extend into the picking area are included in the set of picked objects.

The step in box 302 reads the current mouse position and uses the two-dimensional coordinates of the position indicated by the mouse to produce data indicating the source and direction of a new ray extending from the viewpoint through the position indicated by the mouse. On the Silicon Graphics workstation, the mapw function can be used to obtain the coordinates of the new ray using the coordinates of the current mouse position. Before calling the mapw function, an appropriate transformation matrix is set up using viewpoint data structure 244. The coordinates returned by the mapw function can then be used to produce a unit vector indicating the direction of the new ray.

The step in box 310 begins an iterative loop that handles each of the picked objects. The loop begins in box 312 by finding the point where the new ray from box 302 intersects the next picked object. For a spherical object, for example, this can be done by translating the sphere to the origin and similarly translating the source of the ray, then solving for the distance from the ray's source to the sphere's surface using a quadratic equation. The smallest valid solution is taken as the distance, and the unit vector indicating the direction of the new ray is then used to find the components of the coordinates of the intersection point.

The test in box 314 determines whether the picked object being handled is the first picked object or is closer to the source of the ray than the previous closest picked object. If either condition is met, the step in box 316 sets a value indicating that this picked object is the closest picked object so far and saves the intersection point's coordinates and distance from the ray source.

When all the picked objects have been handled by the iterative loop, the step in box 320 sets values indicating that the closest object found is the currently selected POI object and that the starting POI is at the coordinates of the intersection point on the currently selected POI object. The step in box 320 can also blank the cursor so that it can be replaced by a POI pattern. If the currently selected POI object is planar, the step in box 320 can also calculate the horizontal normal to the plane at the starting POI and a two-dimensional bounding box for the object. Then the routine continues to the step in box 270 in FIG. 10.

4. POI and Viewpoint Motion

Figure 12:
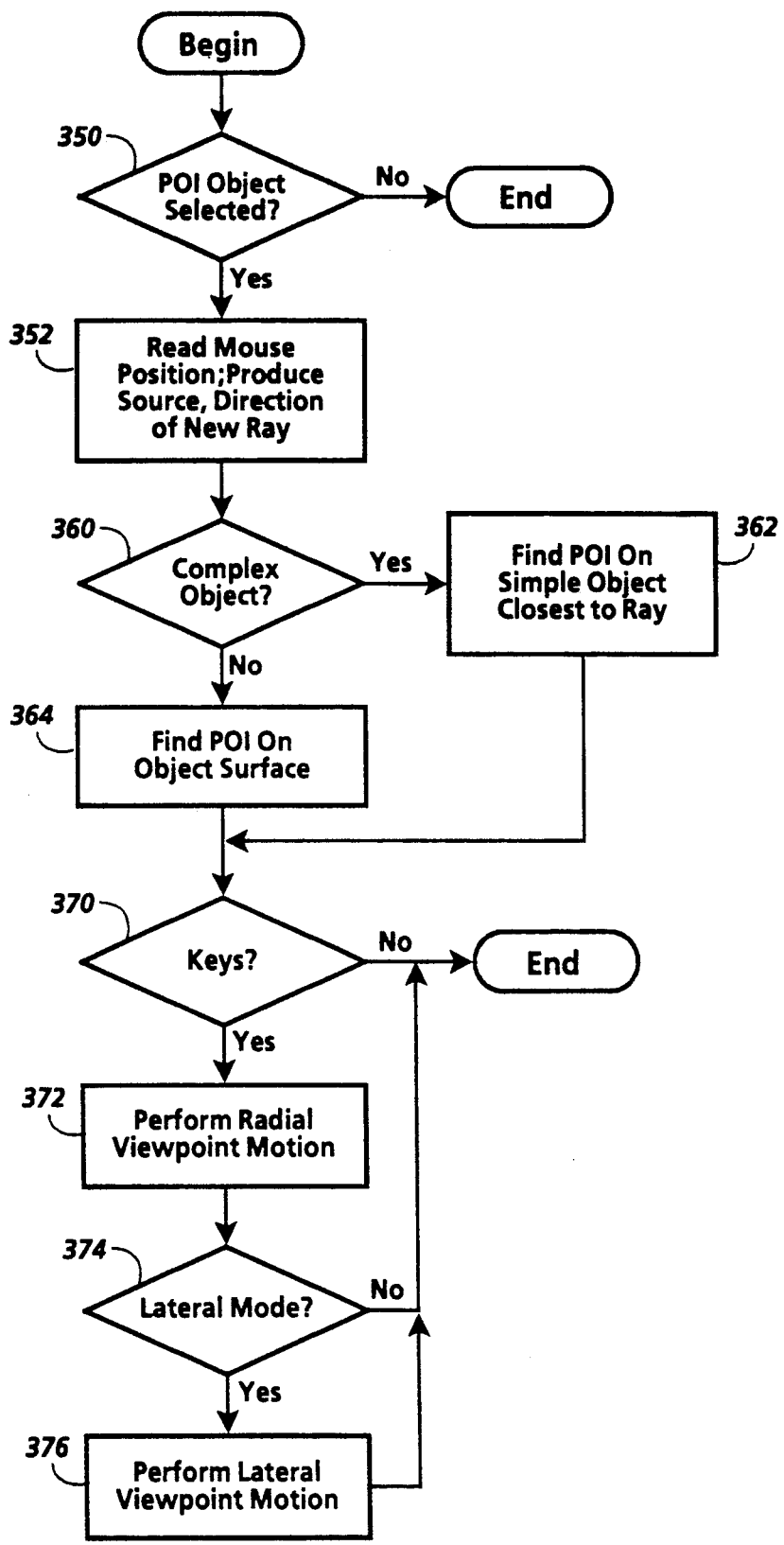
FIG. 12 is a flow chart showing steps in finding a current point of interest and viewpoint position in FIG. 10.
Figure 13:
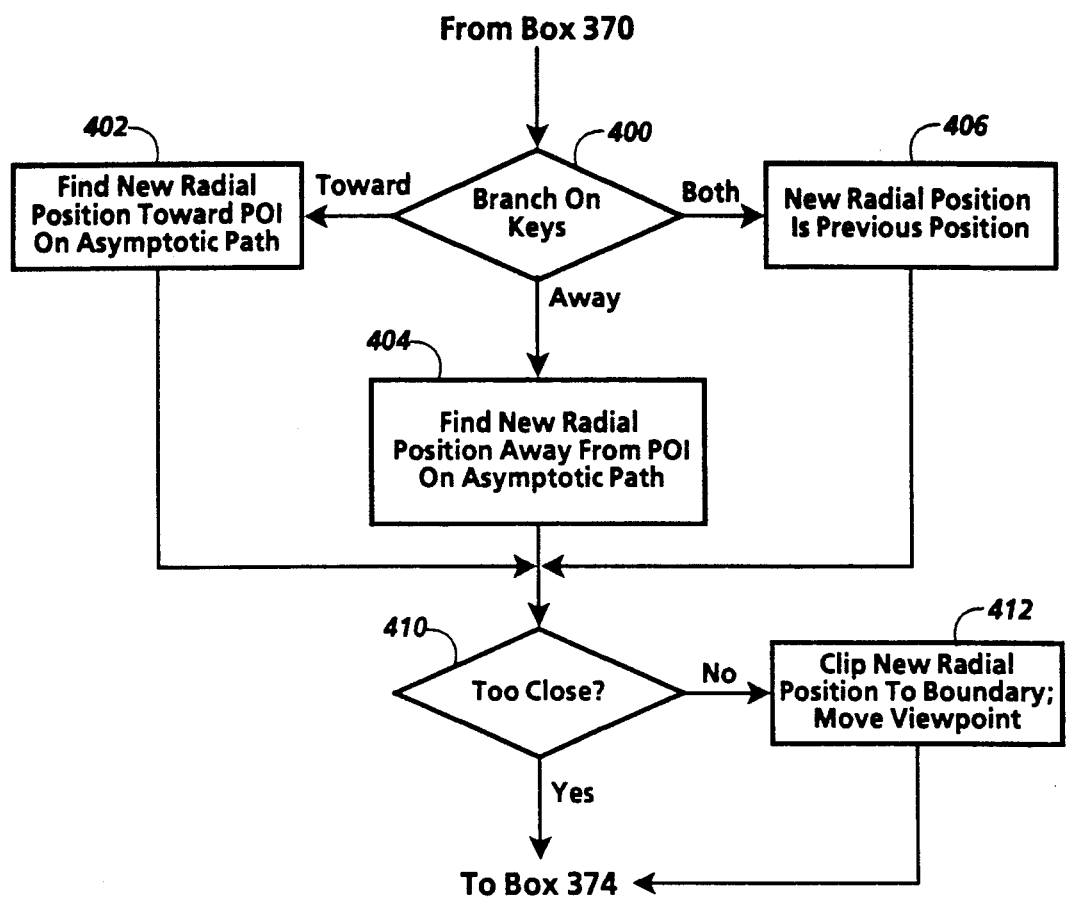
FIG. 13 is a flow chart showing steps in radial viewpoint motion in FIG. 12.
Figure 14:
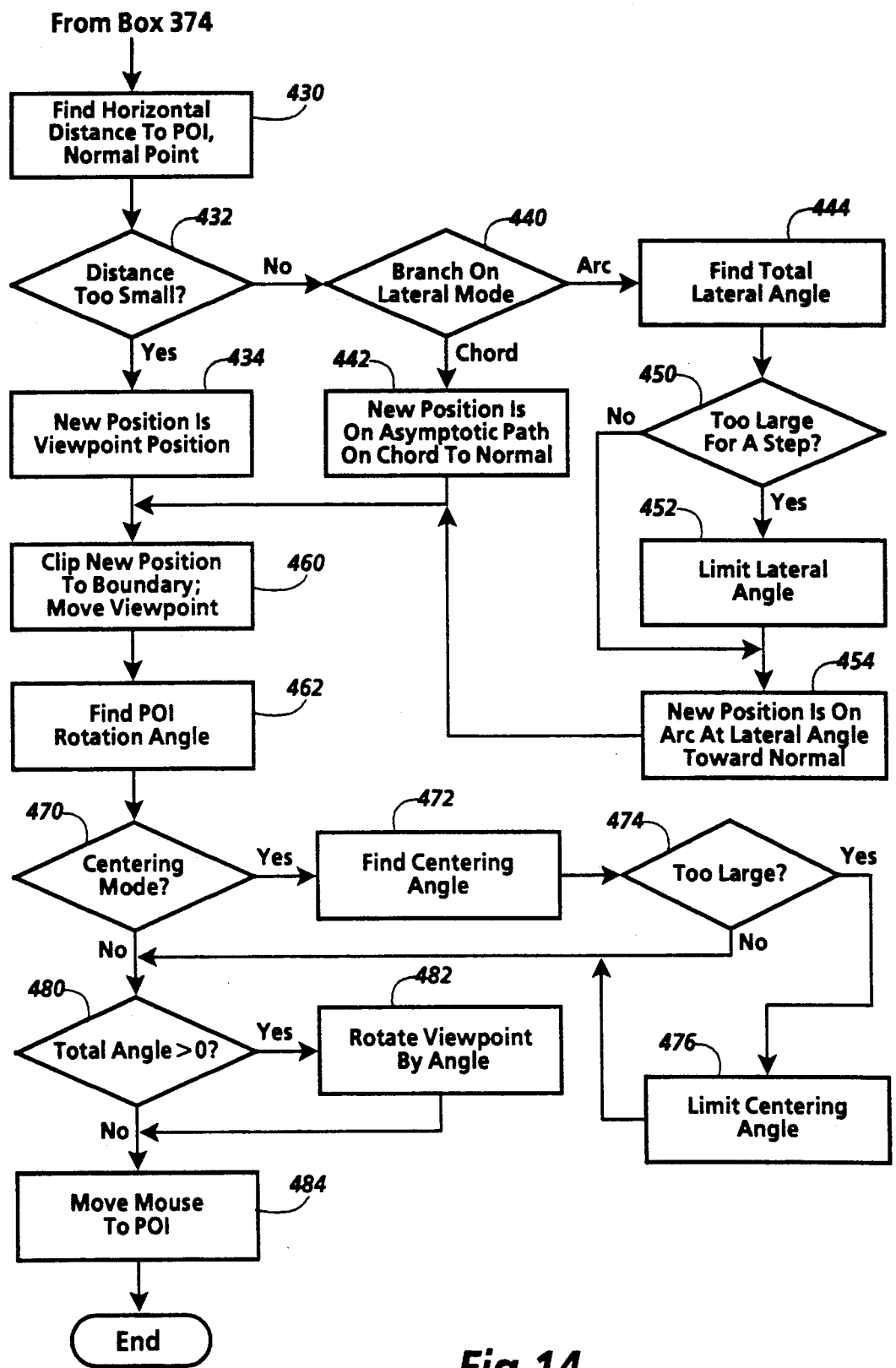
FIG. 14 is a flow chart showing steps in lateral viewpoint motion in FIG. 12.

Finding the current POI and viewpoint in the step in box 270 in FIG. 10 could be implemented in various ways. FIG. 12 shows steps in finding the current POI and general steps in finding the current viewpoint. FIG. 13 shows steps in radial viewpoint motion. FIG. 14 shows steps in lateral viewpoint motion. The step in box 350 in FIG. 12 begins by branching based on whether a POI object is currently selected. If not, the subroutine ends, but if a POI object is currently selected, the step in box 352 reads the current mouse position and uses the two-dimensional coordinates of the position indicated by the mouse to produce data indicating the source and direction of a new ray extending from the viewpoint through the position indicated by the mouse. On the Silicon Graphics workstation, the mapw function can be used to obtain the coordinates of this ray using the coordinates of the current mouse position. Before calling the mapw function, an appropriate transformation matrix is set up using viewpoint data structure 244. The coordinates returned by the mapw function can then be used to produce a unit vector indicating the direction of the new ray.

The step in box 360 branches based on whether the current POI object is a complex object, meaning an object that includes a number of attached simple objects. If so, the step in box 362 finds the POI on the simple object closest to the ray from box 352. If the object is already a simple object, the step in box 364 finds the POI on its surface. The POI may be found differently for differently objects, depending on their geometry. For example, if the object is planar, such as a rectangle, and can be described with plane equations, the intersection with a ray can be calculated by parametric substitution. A similar parametric substitution can be used for spherical objects.

The step in box 370 branches based on whether either of the keys requesting viewpoint motion are depressed. If neither is depressed, the subroutine ends. If either is depressed, the step in box 372 performs radial viewpoint motion as requested. Then, if the step in box 374 determines that the system is in a mode that allows lateral viewpoint motion, the step in box 376 performs appropriate lateral motion before the subroutine ends.

FIG. 13 shows steps that can be performed to implement the step in box 372 in FIG. 12. The step in box 400 begins by branching on the keys that request viewpoint motion. The space bar can indicate viewpoint motion toward the POI and the left alt key can indicate viewpoint motion away from the POI. If both are depressed, lateral viewpoint motion toward the POI normal can be provided if in a mode allowing lateral motion.

If the space bar is depressed, indicating motion toward the POI, the step in box 402 finds a new radial position of the viewpoint on an asymptotic path toward the POI. The following equations can be used to obtain new viewpoint coordinates $eye_x$, $eye_y$, and $eye_z$:

$$eye_x = eye_x - percentRadialApproach \times (eye_x - poi_x);$$

$$eye_y = eye_y - percentRadialApproach \times (eye_y - poi_y);$$
and $$eye_z = eye_z - percentRadialApproach \times (eye_z - poi_z).$$

where percentRadialApproach can be a value stored during initialization. The choice of a value depends on the speed of the animation loop being used; a wide range of values around 0.15 have been used to produce satisfactory motion.

If the left alt key is depressed, indicating motion away from the POI, the step in box 404 finds a new radial position of the viewpoint on an asymptotic path away from the POI. The following equations can be used to obtain new viewpoint coordinates $eye_x$, $eye_y$, and $eye_z$:

$$eye_x = eye_x + percentRadialRetreat \times (eye_x - poi_x);$$

$$eye_y = eye_y + percentRadialRetreat \times (eye_y - poi_y);\text{ and}$$

$$eye_z = eye_z + percentRadialRetreat \times (eye_z - poi_z).$$

where percentRadialRetreat can be a value stored during initialization, and can be chosen such that the asymptotic path away from the POI retraces the asymptotic path toward the POI.

If both the space bar and the left alt key are depressed, indicating lateral motion only, the step in box 406 sets the new radial position of the viewpoint equal to the previous viewpoint position.

The step in box 410 tests the new radial position from box 402, box 404, or box 406 to determine whether it is too close to the POI position. This can be done by comparing the distance between the new radial position and the POI position with a minimum distance. If the new radial position is too close, the subroutine continues to box 374 in FIG. 12 without changing the previous viewpoint position. But if the new radial position is far enough away from the POI, the step in box 412 performs a clipping operation on the new radial position and the workspace boundaries and then moves the viewpoint to the clipped new radial position. The step in box 412 could, for example, clip the new radial position with boundaries defined by walls or other display features.

FIG. 14 shows steps that can be performed to implement the step in box 376 in FIG. 12. The step in box 430 begins by finding the horizontal distance from the POI to the viewpoint, which is simply the square root of the sum of the squares of the differences between the x and z coordinates of the POI and the viewpoint, and by finding a normal point that is on the horizontal normal at the POI and is also the horizontal distance from the POI. The normal point can be obtained by the following equations:

$$normal_x = poi_x + horzDistance \times poiNormal_x;$$

$$normal_y = poi_y;\text{ and}$$

$$normal_z = poi_z + horzDistance \times poiNormal_z.$$

In the general case, the normal point could be on the normal at the POI, so that the following equations could be used:

$$normal_x = poi_x + distance \times poiNormal_x;$$

$$normal_y = poi_y + distance \times poiNormal_y;\text{ and}$$

$$normal_z = poi_z + distance \times poiNormal_z.$$

where distance is the distance from the POI to the viewpoint in three dimensions.

The step in box 432 tests whether the horizontal distance from box 430 is so small that lateral motion is inappropriate, in which case the step in box 434 sets the new position to the previous viewpoint position.

The step in box 440 branches based on which mode of lateral viewpoint motion is in effect. In the chord mode, the viewpoint follows a chord as illustrated in FIG. 6. In the arc mode, the viewpoint follows an arc as illustrated in FIG. 5.

In the chord mode, the step in box 442 sets the new position to a point on the chord between the viewpoint position and the normal point. The viewpoint can follow an asymptotic path along the chord, in which case a logarithmic function can be used to find the new position. The following equations can be used:

$$eye_x = eye_x + percentLateral \times (eye_x - normal_x);$$

$$eye_y = eye_y + percentLateral \times (eye_y - normal_y);\text{ and}$$

$$eye_z = eye_z + percentLateral \times (eye_z - normal_z),$$

where percentLateral can be a value stored during initialization. The choice of a value depends on the value of percentRadialApproach, because the viewpoint should move to the normal before the desired radial distance is reached. With percentRadialApproach having the value 0.15, the value 0.25 for percentLateral has been used to produce satisfactory lateral motion.

In the arc mode, the step in box 444 finds the total lateral angle from the viewpoint position to the normal point. This lateral angle, $\theta$, can be found by the equations:

$$\theta_{eye} = atan(eye_x - poi_x, eye_z - poi_z);$$

$$\theta_{normal} = atan(poiNormal_x, poiNormal_z);\text{ and}$$

$$\theta = \theta_{normal} - \theta_{eye}.$$

in which atan is the arctangent function.

The step in box 450 then tests whether $\theta$ is too large to permit lateral motion to the normal point in a single step. The viewpoint position can follow an asymptotic path along the arc, using the following equation:

$$\theta = (1 - percentRotate) \times \theta,$$

where percentRotate can be a value stored during initialization, as discussed above in relation to percentLateral. Alternatively, $\theta$ can be compared with a maximum step angle such as n/10; if $\theta$ is too large, the step in box 452 limits $\theta$ to the maximum step angle.

Then, the step in box 454 sets the new position to a point on the arc, which can be done with the following equations:

$$eye_x = poi_x + horzDistance \times sin(\theta_{eye} + \theta);$$

$$eye_y = poi_y;\text{ and}$$

$$eye_z = poi_z + horzDistance \times cos(\theta_{eye} + \theta).$$

For the general case, it is also necessary to calculate a second angle for lateral motion in the y dimension, which can be done with the following equation:

$$\theta_y = atan(poiNormal_y, k) - atan(eye_y - poi_y, horzDistance).$$

where k is the horizontal distance of the poiNormal vector.

When the new position has been found in box 434, box 442, or box 454, the step in box 460 clips the new position to a workspace boundary. The workspace can be thought of as a room, so that the new position is clipped to be within the floor, walls, and ceiling of the room. Clipping can also be used when the viewpoint would fall within the region of the workspace occupied by an object, to move the viewpoint outside the object. After clipping, the arctangent function can be used to recalculate the current angle of the viewpoint and the actual lateral angle for use in subsequent calculations.

The step in box 462 finds a POI rotation angle that compensates for lateral motion. Without compensation, lateral motion moves the POI out from under the mouse cursor and could move the POI outside the field of view, which would be confusing to the user. For rotation in an x-z plane, the POI rotation angle can be the same as the angle $\theta$ described above. For the general case, where the viewpoint is also rotated in the y dimension, the POI rotation angle combines $\theta$ and $\theta_v$, calculated as set forth above.

The step in box 470 tests whether the viewpoint is being moved in a centering mode. In a centering mode, the viewpoint is also rotated to bring the POI to the center of the field of view. If in the centering mode, the step in box 472 finds the centering angle between the orientation of the viewpoint and the direction of a ray from the viewpoint to the POI, which can be done in the x-z plane using the following equation:

$$\theta = atan(poi_x - eye_x, poi_z - eye_z) - atan(dob_x, dob_z).$$

where dob indicates a horizontal direction of body vector of length one. The direction of body vector indicates the direction of the viewpoint in the x-z plane.

The step in box 474 compares the centering angle from box 472 with a maximum centering angle such as eighteen degrees to determine whether it is too large. If so, the step in box 476 limits the centering angle by setting it to the maximum centering angle.

When the POI rotation angle and the centering angle have both been found, the step in box 480 determines whether the sum of the two angles, $\theta_t$, is sufficiently greater than zero to provide meaningful viewpoint rotation. If so, the step in box 482 rotates the viewpoint accordingly. This step can be performed by modifying the direction of body vector using the following equations:

$$dob_x = dob_x + \sin\theta_t$$

$$dob_z = dob_z + \cos\theta_t.$$

In an x-z plane, the viewpoint can be rotated by modifying only the dob, because the dob is implemented with x and z components only. For the general case, where the viewpoint is also rotated in the y dimension, the direction of gaze vector, designated dog, also assumed to be of length one, can be modified with the following equation:

$$dog_y = dog_y + \sin(\theta_v).$$

where $\theta_v$ is calculated as set forth above. The dog vector can be thought of as a vector from the viewpoint into the field of view that follows the axis of a viewing frustum.

When the viewpoint has been rotated, the step in box 484 moves the mouse cursor to the resulting position of the POI. This is necessary so that the user can continue to control POI position.

D. Miscellaneous

The invention has been described with the use of a mouse to provide signals requesting POI motion and a keyboard to provide signals requesting viewpoint motion. The invention could also be implemented with a multidimensional input device such as a VPL glove to point a ray into a three-dimensional workspace. The same input device could also be used to request viewpoint motion, such as by squeezing to indicate a requested type of motion.

The invention can be implemented with the animation techniques described in Robertson, G. G., Card, S. K., and Mackinlay, J. D., "The Cognitive Coprocessor Architecture for Interactive User Interfaces," *Proceedings of the ACM SIGGRAPH Symposium on User Interface Software and Technology*, Williamsburg, Va., Nov. 13-15, 1989, pp. 10-18, incorporated herein by reference.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a system that includes a display, a user input device, and a processor connected for receiving signals from the user input device and for presenting images on the display; the user input device providing region indicating signals indicating regions within images presented and motion requesting signals requesting viewpoint motion; the method comprising steps of:

presenting a first image on the display; the first image including a first surface that is perceptible as viewed from a first viewpoint within a three-dimensional workspace; the step of presenting the first image comprising a substep of storing viewpoint coordinate data indicating a position of the first viewpoint in the three-dimensional workspace;

receiving a first region indicating signal and a first motion requesting signal from the user input device; the first region indicating signal indicating a first region on the first surface; the first motion requesting signal requesting viewpoint motion relative to the first region; and presenting a second image on the display; the second image including a second surface that is perceptible as a continuation of the first surface viewed from a second viewpoint within the three-dimensional workspace, the second viewpoint being displaced from the position indicated by the stored viewpoint coordinate data relative to the first region on the first surface in accordance with the first motion requesting signal.

2. The method of claim 1 in which the first region indicating signal indicates a point on the first surface.

3. The method of claim 1 in which the first viewpoint is perceptible as positioned at a first distance from the first region and the second viewpoint is perceptible as positioned at a second distance from the first region, the second distance being shorter than the first distance.

4. The method of claim 1 in which the first viewpoint is perceptible as positioned at a first distance from the first region and the second viewpoint is perceptible as positioned at a second distance from the first region, the second distance being longer than the first distance.

5. The method of claim 1 in which the first surface is perceptible as having a normal in the first region, the second viewpoint being closer to the normal than the first viewpoint.

6. The method of claim 5 in which the first viewpoint is perceptible as having a first direction of orientation and the second viewpoint is perceptible as having a second direction of orientation; the second direction of orientation being shifted toward the first region from the first direction of orientation.

7. The method of claim 6 in which the second viewpoint is perceptible as closer to the normal than the first viewpoint by an arc length and the second direction of orientation is perceptible as shifted by a shift angle from the first direction of orientation; the shift angle being an angle subtended by the arc length.

8. The method of claim 6 in which the second direction of orientation is perceptible as shifted by a shift angle from the first direction of orientation; the second image being perceptible as having a center of view; the shift angle bringing the first region toward the center of view.

9. The method of claim 1 in which the first viewpoint is perceptible as having a first direction of orientation and the second viewpoint is perceptible as having a second direction of orientation; the second direction of orientation being shifted toward the first region from the first direction of orientation.

10. The method of claim 1, further comprising a step of receiving a second region indicating signal from the user input device; the second region indicating signal indicating a second region on the second surface, the second region being perceptible as a displaced continuation of the first region.

11. A method of operating a system that includes a display, a user input device, and a processor connected for receiving signals from the user input device and for presenting images on the display; the user input device providing region indicating signals indicating regions within images presented on the display and motion requesting signals requesting viewpoint motion; the method comprising a sequence of steps, each step comprising substeps of:

presenting a respective image on the display; each respective image including a respective surface that is perceptible as being viewed from a respective viewpoint within a three-dimensional workspace; the substep of presenting the respective image comprising a substep of storing respective coordinate data indicating a position of the respective viewpoint in the three-dimensional workspace; and receiving a respective region indicating signal and a respective motion requesting signal from the user input device; each respective region indicating signal indicating a respective region on the respective surface; each respective motion requesting signal requesting viewpoint motion relative to the respective region;

the sequence of steps including a first step and a number of following steps, each following step having a next preceding step; the respective surface of each following step being perceptible as a continuation of the respective surface of the next preceding step; the respective viewpoint of each following step being displaced from the position indicated by the respective coordinate data stored in the next preceding step relative to the respective region of the next preceding step in accordance with the respective motion requesting signal of the next preceding step.

12. The method of claim 11 in which each step's respective region indicating signal indicates a respective point on the respective surface.

13. The method of claim 11 in which the respective viewpoint of each following step is displaced from the respective viewpoint of the next preceding step by a respective approach displacement toward the respective region of the next preceding step.

14. The method of claim 13 in which the respective approach displacements define an asymptotic path in the three-dimensional workspace.

15. The method of claim 13 in which the respective approach displacements follow a logarithmic function.

16. The method of claim 13 in which the respective viewpoint and region of each step are perceptible as positioned at a respective distance from each other; the respective approach displacement of each following step being a proportion of the respective distance of the next preceding step.

17. The method of claim 11 in which the respective viewpoint of each following step is displaced from the respective viewpoint of the next preceding step by a respective retreat displacement away from the respective region of the next preceding step.

18. The method of claim 17 in which the respective retreat displacements follow a logarithmic function.

19. The method of claim 17 in which the respective viewpoint and region of each step are perceptible as positioned at a respective distance from each other; the respective retreat displacement of each following step being a proportion of the respective distance of the next preceding step.

20. The method of claim 11 in which the respective surface of each step is perceptible as having a respective normal in the respective region; the respective viewpoint of each following step being displaced from the respective viewpoint of the next preceding step by a respective lateral displacement toward the respective normal of the next preceding step.

21. The method of claim 20 in which the respective lateral displacements define an asymptotic path in the three-dimensional workspace.

22. The method of claim 20 in which the respective lateral displacements follow a logarithmic function.

23. The method of claim 20 in which the respective normal of each step includes a respective lateral position point; the respective viewpoint and lateral position point of each following step being perceptible as positioned at a respective lateral distance from each other; the respective lateral displacement of each following step being a proportion of the respective lateral distance of the next preceding step.

24. The method of claim 11 in which the respective viewpoint of each step is perceptible as having a respective direction of orientation; the respective direction of orientation of each following step being shifted toward the respective region of the next preceding step from the respective direction of orientation of the next preceding step.

25. The method of claim 11, in which each following step further comprises a substep of presenting within the respective image a shape positioned about the respective region of the next preceding step.

26. The method of claim 25 in which the shape is presented so that it is perceptible as being parallel to the respective surface at the respective region of the next preceding step.

27. The method of claim 11 in which the respective surface of each step is bounded; the respective motion requesting signal of the first step being a beginning motion requesting signal and the respective motion requesting signal of a second step that is one of the following steps being an ending motion requesting signal, the respective region of each step after the first step through the second step being constrained to stay within the bounded respective surface of the step.

28. A method of operating a system that includes a display, a user input device, and a processor connected for receiving signals from the user input device and for presenting images on the display; the user input device providing motion requesting signals requesting viewpoint motion; the method comprising steps of:
   presenting a first image on the display; the first image including a first surface that is perceptible as being viewed from a first viewpoint within a three-dimensional workspace; the first surface including a first region; the first viewpoint being positioned at a first distance from the first region;
   receiving a first motion requesting signal requesting viewpoint motion from the user input device; and
   presenting a second image on the display; the second image including a second surface that is perceptible as a continuation of the first surface viewed from a second viewpoint within the three-dimensional workspace; the second viewpoint being displaced by a First displacement from the first viewpoint in accordance with the first motion requesting signal; the first displacement being a function of the first distance.

29. The method of claim 28 in which the first displacement is an approach displacement toward the first region.

30. The method of claim 28 in which the first displacement is a retreat displacement away from the first region.

31. The method of claim 28 in which the first displacement is a logarithmic function of the first distance.

32. The method of claim 28 in which the first displacement is a proportion of the first distance.

33. The method of claim 28 in which the first region includes a point, the first distance being a distance between the first viewpoint and the point.

34. The method of claim 28 in which the first surface is perceptible as having a normal in the first region, the first displacement being a lateral displacement toward the normal.

35. The method of claim 34 in which the first displacement is a proportion of a line between the first viewpoint and a normal point, the normal point being on the normal and at the first distance from the region.

36. The method of claim 35 in which the line is an arc.

37. The method of claim 35 in which the line is a chord.

38. The method of claim 34 in which the first viewpoint is perceptible as having a first direction of orientation and the second viewpoint is perceptible as having a second direction of orientation; the second direction of orientation being shifted toward the first region from the first direction of orientation.

39. The method of claim 34 in which the second viewpoint is perceptible as closer to the normal than the first viewpoint by an arc length and the second direction of orientation is perceptible as shifted by a shift angle from the first direction of orientation; the shift angle being an angle subtended by the arc length.

40. The method of claim 34 in which the second direction of orientation is perceptible as shifted by a shift angle from the first direction of orientation; the second image being perceptible as having a center of view; the shift angle bringing the first region toward the center of view.

41. The method of claim 28 in which the first viewpoint is perceptible as having a first direction of orientation and the second viewpoint is perceptible as having a second direction of orientation; the second direction of orientation being shifted toward the first region from the first direction of orientation.

42. A method of operating a system that includes a display, a user input device, and a processor connected for receiving signals from the user input device and for presenting images on the display; the user input device providing motion requesting signals requesting viewpoint motion; the method comprising a sequence of steps, each step comprising substeps of:
   presenting a respective image on the display; each respective image including a respective surface that is perceptible as being viewed from a respective viewpoint within a three-dimensional workspace; each step's respective surface including a respective region; the respective viewpoint being positioned at a respective distance from the respective region; and
   receiving a respective motion requesting signal requesting viewpoint motion from the user input device; each respective motion requesting signal requesting viewpoint motion;
   the sequence of steps including a first step and a number of following steps, each following step having a next preceding step; the respective surface of each following step being perceptible as a continuation of the respective surface of the next preceding step; the respective viewpoint of each following step being displaced by a respective displacement from the respective viewpoint of the next preceding step in accordance with the next preceding step's motion requesting signal; the respective displacement of each following step being a function of the respective distance of the next preceding step.

43. The method of claim 42 in which the respective surface of each step is perceptible as having a respective normal in the respective region; the respective displacement of each following step including a respective radial component that is a function of the respective distance of the next preceding step and a respective lateral component toward the respective normal of the next preceding step.

44. The method of claim 43 in which the respective radial component of each following step is a first proportion of the respective distance of the next preceding step; the respective radial component indicating a respective intermediate viewpoint; the respective normal of each step including a respective lateral position point; the respective intermediate viewpoint of each following step and the lateral position point of the next preceding step being perceptible as positioned at a respective lateral distance from each other; the respective lateral component of each following step being a second proportion of the respective lateral distance.

45. The method of claim 44 in which the second proportion is greater than the first proportion.

46. A method of operating a system that includes a display, a user input device, and a processor connected for receiving signals from the user input device and for presenting images on the display; the user input device providing motion requesting signals requesting viewpoint motion; the method comprising a sequence of steps, each step comprising substeps of:

presenting a respective image on the display; each respective image including a respective surface that is perceptible as being viewed from a respective viewpoint within a three-dimensional workspace; each step's respective surface including a respective region; the respective viewpoint being positioned at a respective distance from the respective region; and receiving a respective motion requesting signal requesting viewpoint motion from the user input device; each respective motion requesting signal requesting viewpoint motion;

the sequence of steps including a first step and a number of following steps, each following step having a next preceding step; the respective surface of each following step being perceptible as a continuation of the respective surface of the next preceding step; the respective viewpoint of each following step being displaced by a respective displacement from the respective viewpoint of the next preceding step in accordance with the next preceding step's motion requesting signal;

the following steps including first and second following steps; the respective motion requesting signal of the next preceding step of the first following step requesting motion toward the respective region of the next preceding step; the respective motion requesting signal of the next preceding step of the second following step requesting motion away from the respective region of the next preceding step; the respective displacement of the first following step including a first proportional component that is a first proportion of the respective distance of the next preceding step; the respective displacement of the second following step including a second proportional component that is a second proportion of the respective distance of the next preceding step.

47. The method of claim 46 in which the first following step is the next preceding step of the second following step, the second proportion and the first proportion being such that the first and second proportional components are equal in magnitude.

48. A method of operating a system that includes a display, a user input device, and a processor connected for receiving signals from the user input device and for presenting images on the display; the user input device providing motion requesting signals requesting viewpoint motion; the method comprising a sequence of steps, each step comprising substeps of:

presenting a respective image on the display; each respective image including a respective surface that is perceptible as being viewed from a respective viewpoint within a three-dimensional workspace; each step's respective surface including a respective region; the substep of presenting the respective image comprising a substep of storing respective coordinate data indicating a position of the respective viewpoint in the three-dimensional workspace; and receiving a respective motion requesting signal requesting viewpoint motion from the user input device; each respective motion requesting signal requesting viewpoint motion toward the respective region;

the sequence of steps including a first step and a number of following steps, each following step having a next preceding step; the respective surface of each following step being perceptible as a continuation of the respective surface of the next preceding step; the respective viewpoint of each following step being displaced by a respective displacement from the respective viewpoint of the next preceding step toward the respective region of the next preceding step; the respective displacement of each following step being a function of the position indicated by the next preceding step's respective coordinate data such that the respective displacements define an asymptotic path.

49. The method of claim 48 in which each step's respective region includes a respective point, the respective displacement of each following step being a function of a respective distance between the position indicated by the next preceding step's respective coordinate data and the next preceding step's respective point.

50. The method of claim 49 in which the respective displacement of each following step is a logarithmic function of the respective distance.

51. The method of claim 49 in which the respective displacement of each following step is a proportion of the respective distance.

52. A method of operating a system that includes a display, user input means for providing signals, and a processor connected for receiving signals from the user input means and for presenting images on the display; the user input means providing motion requesting signals; the motion requesting signals requesting viewpoint motion and point of interest motion; the user input means being structured so that the user can request viewpoint motion and point of interest motion independently; the method comprising steps of:

presenting a first image on the display; the first image including a first surface that is perceptible as viewed from a first viewpoint within a three-dimensional workspace; the first image including a first point of interest on the first surface; the step of presenting the first image comprising a substep of storing viewpoint coordinate data indicating a position of the first viewpoint in the three-dimensional workspace;

receiving a first motion requesting signal set from the user input means, the first motion requesting signal set requesting a first viewpoint motion and a first point of interest motion; and in response to the first motion requesting signal, presenting a second image on the display; the second image including a second surface that is perceptible as a continuation of the first surface viewed from a second viewpoint within the three-dimensional workspace, the second viewpoint being displaced from the position indicated by the stored viewpoint coordinate data in accordance with the first viewpoint motion; the second image including a second point of interest on the second surface, the second point of interest being displaced in accordance with the first point of interest motion.

53. The method of claim 52 in which the first and second surfaces are each bounded; the first and second points of interest being constrained to stay within the bounded first and second surfaces, respectively.

54. The method of claim 52 in which the first image further includes a first shape indicating the first point of interest and the second image further includes a second shape indicating the second point of interest, the second shape being perceptible as a moved continuation of the first shape.

55. The method of claim 52 in which the first viewpoint motion includes radial motion, the second viewpoint being displaced radially along a ray extending from the second point of interest through the first viewpoint.

56. The method of claim 55 in which the second viewpoint is displaced radially toward the second point of interest.

57. The method of claim 55 in which the second viewpoint is displaced radially away from the second point of interest.

58. The method of claim 52 in which the second surface is perceptible as having a normal at the second point of interest, the first viewpoint motion including lateral motion, the second viewpoint being displaced laterally toward the normal.

59. A system comprising:
a display;
user input means for providing signals; and
a processor connected for receiving signals from the user input means and for presenting images on the display; the processor having memory;
the user input means providing motion requesting signals requesting viewpoint motion and point of interest motion; the user input means being structured so that the user can request viewpoint motion and point of interest motion independently;
the processor comprising first means for presenting a first image on the display; the first image including a first surface that is perceptible as viewed from a first viewpoint within a three-dimensional workspace; the first image including a first point of interest on the first surface; the first means further storing viewpoint coordinate data in memory, the viewpoint coordinate data indicating a position of the first viewpoint in the three-dimensional workspace;
the processor further comprising second means for receiving a first motion requesting signal set from the user input means, the first motion requesting signal set requesting a first viewpoint motion and a first point of interest motion;
the processor further comprising third means for responding to the first motion requesting signal set by presenting a second image on the display; the second image including a second surface that is perceptible as a continuation of the first surface viewed from a second viewpoint within the three-dimensional workspace, the second viewpoint being displaced from the position indicated by the stored viewpoint coordinate data in accordance with the first viewpoint motion; the second image including a second point of interest on the second surface, the second point of interest being displaced in accordance with the first point of interest motion.

60. The system of claim 59 in which the the user input means comprises a mouse, the user requesting point of interest motion by operating the mouse, the first motion requesting signal set including data indicating mouse operation.

61. The system of claim 59 in which the user input means comprises a keyboard, the user requesting viewpoint motion by operating the keyboard, the first motion requesting signal set including data indicating keyboard operation.

62. The system of claim 61 in which the user requests viewpoint motion relative to the second point of interest, the keyboard having a first key and a second key, the user operating the first key to request motion toward the second point of interest, the user operating the second key to request motion away from the second point of interest.

63. A method of operating a system that includes a display, a user input device, and a processor connected for receiving signals from the user input device and for presenting images on the display; the user input device providing region indicating signals indicating regions within images presented and motion requesting signals requesting viewpoint motion; the method comprising steps of:
presenting a first image on the display; the first image including a first surface that is perceptible as viewed from a first viewpoint within a three-dimensional workspace; the step of presenting the first image comprising a substep of storing first viewpoint coordinate data indicating a position of the first viewpoint in the three-dimensional workspace;
receiving a first region indicating signal and a first motion requesting signal from the user input device; the first region indicating signal indicating a point within a first region on the first surface; the first motion requesting signal requesting viewpoint motion relative to the first region;
using the first region indicating signal, the first motion requesting signal, and the first viewpoint coordinate data to obtain second viewpoint coordinate data indicating a position of a second viewpoint in the three-dimensional workspace; the position of the second viewpoint being moved from the position of the first viewpoint relative to the first region on the first surface in accordance with the viewpoint motion requested by the first motion requesting signal; and
using the second viewpoint coordinate data to present a second image on the display; the second image including a second surface that is perceptible as a continuation of the first surface viewed from the second viewpoint within the three-dimensional workspace.

64. A method of operating a system that includes a display, a user input device, and a processor connected for receiving signals from the user input device and for presenting images on the display; the user input device providing region indicating signals indicating regions within images presented on the display and motion requesting signals requesting viewpoint motion; the method comprising a sequence of steps, each step comprising substeps of:
presenting a respective image on the display; each respective image including a respective surface that is perceptible as being viewed from a respective viewpoint within a three-dimensional workspace; the substep of presenting the respective image comprising a substep of storing respective coordinate data indicating a position of the respective viewpoint in the three-dimensional workspace; and receiving a respective region indicating signal and a respective motion requesting signal from the user input device; each respective region indicating signal indicating a point within a respective region on the respective surface; each respective motion requesting signal requesting viewpoint motion relative to the respective region;

the sequence of steps including a first step and a number of following steps, each following step having a next preceding step; each following step further comprising a substep of using the respective region indicating signal, the respective motion requesting signal, and the respective coordinate data stored in the next preceding step to obtain the respective coordinate data stored in the following step; the respective surface of each following step being perceptible as a continuation of the respective surface of the next preceding step; the respective viewpoint of each following step being displaced from the position indicated by the respective coordinate data stored in the next preceding step relative to the respective region of the next preceding step in accordance with the respective region of the next preceding step in accordance with the respective motion requesting signal of the next preceding step.

* * * * *

(12) EX PARTE REEXAMINATION CERTIFICATE (7883rd)

United States Patent
Mackinlay et al.

(10) Number: US 5,276,785 C1
(45) Certificate Issued: Nov. 23, 2010

(54) MOVING VIEWPOINT WITH RESPECT TO A TARGET IN A THREE-DIMENSIONAL WORKSPACE

(75) Inventors: Jock Mackinlay, Palo Alto, CA (US); George G. Robertson, Palo Alto, CA (US); Stuart K. Card, Los Altos Hills, CA (US)

(73) Assignee: Xerox Corporation, Stamford, CT (US)

Reexamination Request:
No. 90/009,557, Aug. 12, 2009

Reexamination Certificate for:
Patent No.: 5,276,785
Issued: Jan. 4, 1994
Appl. No.: 07/561,627
Filed: Aug. 2, 1990

(51) Int. Cl.
*G06F 3/033* (2006.01)
*G06T 15/70* (2006.01)

(52) U.S. Cl. ...................................................... 345/427
(58) Field of Classification Search .................. None
See application file for complete search history.

(56) References Cited

U.S. PATENT DOCUMENTS 4,807,158 A 2/1989 Blanton et al.

OTHER PUBLICATIONS

Hanson, Andrew J. and Quam, Lynn H., "Overview of the SRI Cartographic Modeling Environment," Proceedings of the Image Understanding Workshop, Boston, MA, pp. 576–582, Apr. 6–8, 1988.
Hanson et al. SRI, "Cartographic Modeling System," ACM SIGGRAPH Video Review, Issue No. 29, Video No.7, 1987.
Phillips, Cary B. and Badler, Norman I., "Jack: A Toolkit for Manipulating Articulated Figures," Proceedings of the ACM SIGGRAPH Symposium on User Interface Software and Technology, pp. 221–229, Oct. 1988.
Issacs, N.W. and Taylor, M.R. (eds.), *Crystallographic Computing 4: Techniques and New Technologies,* Oxford University Press, New York, NY, Chapters 15 and 16, pp. 223–267, 1988.
Blinn, Jim, "Where am I? What am I looking at?" IEEE Computer Graphics and Applications, vol. 8, Issue 4, pp. 76–81, Jul. 1988.
Holzman, Robert E., "Atoms to Astronomy: Computer Graphics at the Jet Propulsion Laboratory," *The Visual Computer,* vol. 2, pp. 159–163, Jul. 1986.
"The Tactical Edge," Evans & Sutherland, Issue 5 SIGGRAPH '82 Film & Video Show, SIGGRAPH Video Review, 1982.
Briggs, John, A., "CT6 Automobile," Evans & Sutherland, ACM SIGGRAPH Video Review, Issue 38, Video No. 9, 1988.
Bier, Eric A., "Snap–Dragging in Three Dimensions," *Computer Graphics,* vol. 24, No. 2, pp. 193–204, Mar. 1990.
Blinn, James F., "The Ancient Chinese Art of Chi–Ting," Jet Propulsion Laboratoy, California Institute of Technology, Pasadena, CA, pp. 1–5, Jan. 1988.
Microsoft Flight Simulator Version 3 Manual, 1988.

*Primary Examiner*—Deandra M Hughes

(57) ABSTRACT

Images are presented on a display to produce the perception of viewpoint motion in a three-dimensional workspace. The user can indicate a point of interest (POI) or other region on a surface in an image and request viewpoint motion. In response, another image is presented from a viewpoint that is displaced as requested. The user can request viewpoint motion radially toward or away from the POI, and can also request viewpoint motion laterally toward a normal of the surface at the POI. Radial and lateral viewpoint motion can be combined. The orientation of the viewpoint can be shifted during lateral motion to keep the POI in the field of view, and can also be shifted to bring the POI toward the center of the field of view. In a sequence of steps of viewpoint motion, the radial viewpoint displacement in each step can be a proportion of the distance to the POI so that the radial displacements follow a logarithmic function and define an asymptotic path that approaches but does not reach the POI. While requesting viewpoint motion with a keyboard, the user can independently request POI motion with the mouse. In response, the POI moves within the bounds of the surface that includes the POI, and a shape within the image indicates the POI position.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4, 9, 28-30, 41, 42, 52, 54 and 55 are cancelled.

Claims 5-8, 10-27, 31-40, 43-51, 53 and 56-64 were not reexamined.

* * * * *